US008849984B2

(12) United States Patent
Yamagishi

(10) Patent No.: US 8,849,984 B2
(45) Date of Patent: Sep. 30, 2014

(54) BANDWIDTH REQUESTING SYSTEM, BANDWIDTH REQUESTING DEVICE, CLIENT DEVICE, BANDWIDTH REQUESTING METHOD, CONTENT PLAYBACK METHOD, AND PROGRAM

(75) Inventor: Yasuaki Yamagishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1215 days.

(21) Appl. No.: 12/026,132

(22) Filed: Feb. 5, 2008

(65) Prior Publication Data
US 2009/0006626 A1 Jan. 1, 2009

(30) Foreign Application Priority Data

Feb. 15, 2007 (JP) ................ P2007-035414

(51) Int. Cl.
*G06F 15/173* (2006.01)
*H04L 12/54* (2013.01)
*H04L 29/06* (2006.01)

(52) U.S. Cl.
CPC ............. *H04L 65/4076* (2013.01); *H04L 65/80* (2013.01); *H04L 12/5695* (2013.01)
USPC ............... 709/224; 709/223; 709/226

(58) Field of Classification Search
CPC .. H04L 12/5695; H04L 65/4076; H04L 65/80
USPC ........................ 709/223, 224, 226
See application file for complete search history.

(56) References Cited

U.S. PATENT DOCUMENTS

| 6,092,137 A * | 7/2000 | Huang et al. .............. 710/111 |
|---|---|---|
| 6,452,935 B1 * | 9/2002 | Gibbs .................... 370/439 |
| 6,529,499 B1 * | 3/2003 | Doshi et al. ................. 370/352 |
| 6,738,819 B1 * | 5/2004 | Li et al. ..................... 709/229 |
| 7,483,380 B2 * | 1/2009 | Metke ....................... 370/238 |
| 7,859,998 B2 * | 12/2010 | Wade et al. ................. 370/230 |

(Continued)

FOREIGN PATENT DOCUMENTS

JP 2006-101563 4/2006

OTHER PUBLICATIONS

Anne Bodzinga, et al., "Interworking IPTV Services with IMS", 12th International Telecommunications network strategy and planning symposium, Networks 2006, IEEE, XP031014820, ISBN 978-1-4244-0952-5, Nov. 6-9, 2006, 5 pages.

(Continued)

*Primary Examiner* — Mohamed Wasel
(74) *Attorney, Agent, or Firm* — Oblon, Spivak, McClelland, Maier & Neustadt, L.L.P.

(57) ABSTRACT

A bandwidth requesting device is to be connected via a network to a plurality of client devices that play contents. The bandwidth requesting device is to appropriate bandwidths to the plurality of client devices and includes a bandwidth securement requesting unit that determines a request bandwidth, based on bandwidth management information and appropriation request bandwidths sent from the plurality of client devices. The bandwidth securement requesting unit requests a relay server, provided externally from the network, that determines bandwidths usable by the network, to secure the request bandwidth. The bandwidth requesting device also includes a processing unit that resolves, upon a competition among the appropriation request bandwidths sent from the plurality of client devices, the competition. Further, the bandwidth requesting device includes a communication unit that communicates with the relay server and the plurality of client devices to receive the bandwidth management information.

15 Claims, 23 Drawing Sheets

(56) References Cited

U.S. PATENT DOCUMENTS

| | | | |
|---|---|---|---|
| 8,116,337 B2* | 2/2012 | Godlewski et al. | 370/449 |
| 2002/0049037 A1* | 4/2002 | Christensen et al. | 455/3.06 |
| 2002/0188732 A1* | 12/2002 | Buckman et al. | 709/228 |
| 2003/0084144 A1* | 5/2003 | Lipinski | 709/224 |
| 2004/0013119 A1* | 1/2004 | MeLampy et al. | 370/395.21 |
| 2006/0123452 A1* | 6/2006 | Azenkot et al. | 725/111 |
| 2006/0155893 A1* | 7/2006 | Bottemiller et al. | 710/27 |
| 2007/0153746 A1* | 7/2007 | Lee et al. | 370/335 |
| 2007/0189239 A1* | 8/2007 | Lim et al. | 370/337 |
| 2008/0037457 A1* | 2/2008 | Matsukura et al. | 370/315 |
| 2008/0037525 A1* | 2/2008 | Karaoguz et al. | 370/352 |
| 2008/0043668 A1* | 2/2008 | Chen et al. | 370/329 |
| 2008/0077702 A1* | 3/2008 | Posamentier | 709/232 |
| 2012/0176990 A1* | 7/2012 | Zou | 370/329 |
| 2013/0311668 A1* | 11/2013 | Akhtar et al. | 709/231 |

OTHER PUBLICATIONS

F. Baker, et al., "An EF DSCP for Capacity-Admitted Traffic", Standard-Working-Draft, IETF, vol. tsvwg, XP 015048198, ISSN: 0000-0004, Dec. 13, 2006, 17 pages.

H. J. Park, et al. "QoS negotiation for IPTV service using SIP", Advanced Communication Technology, The 9$^{th}$ International Conference on, IEEE, XP031084933, ISBN-978-89-5519-131-8, Feb. 1, 2007, pp. 945-948.

Chae Sub Lee, "IPTV based on NGN Architecture", ITU-T SG 13, XP017410220, vol. study group 13, Jul. 17-28, 2006, pp. 1-10.

Japanese Office Action issued Jul. 12, 2011, in Patent Application No. 2007-035414.

* cited by examiner

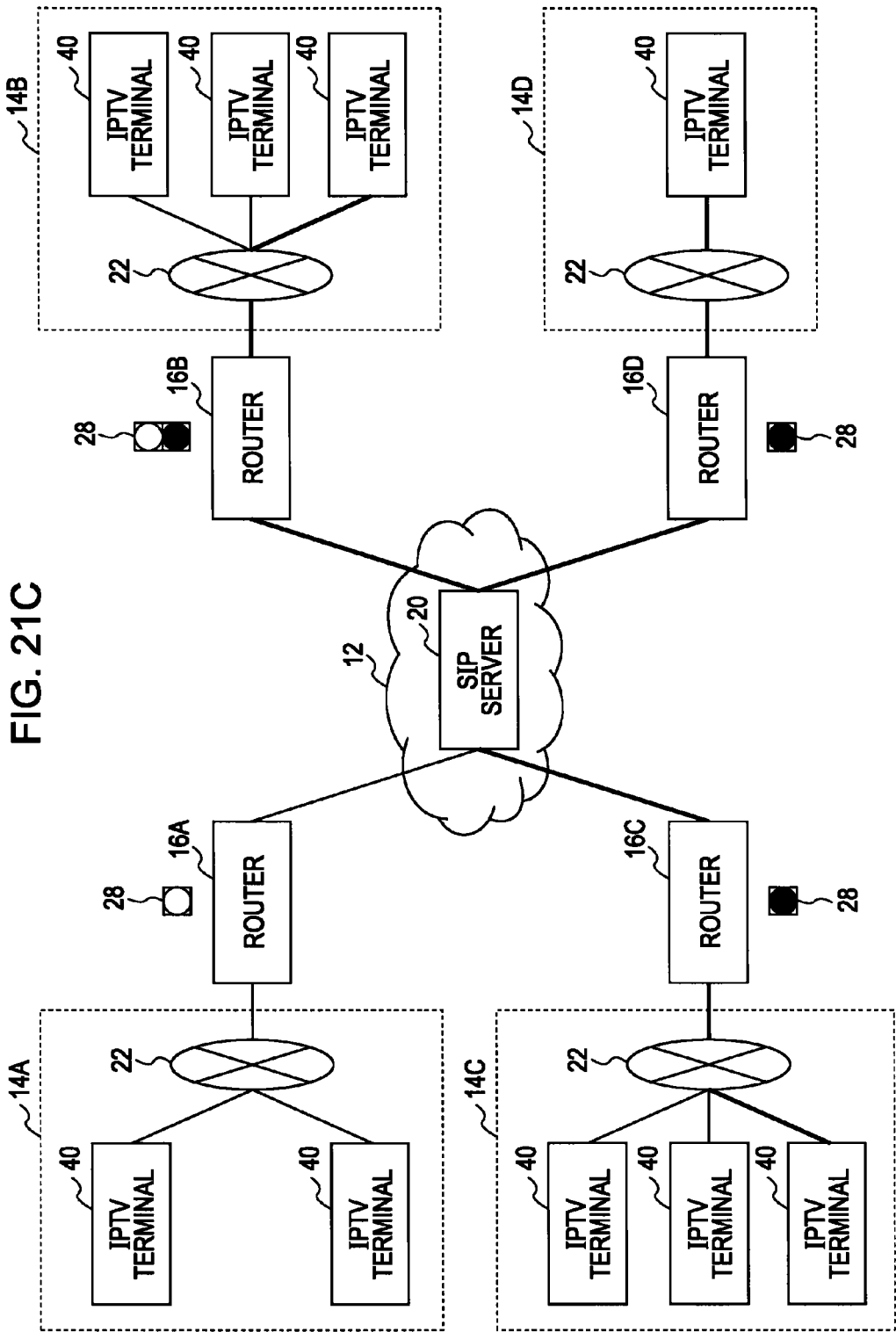

BANDWIDTH REQUESTING SYSTEM, BANDWIDTH REQUESTING DEVICE, CLIENT DEVICE, BANDWIDTH REQUESTING METHOD, CONTENT PLAYBACK METHOD, AND PROGRAM

CROSS REFERENCES TO RELATED APPLICATIONS

The present invention contains subject matter related to Japanese Patent Application JP 2007-035414 filed in the Japanese Patent Office on Feb. 15, 2007, the entire contents of which are incorporated herein by reference.

BACKGROUND OF THE INVENTION

1. Field of the Invention

The present invention relates to a bandwidth requesting system, a bandwidth requesting device, a client device, a bandwidth requesting method, a content playback method, and a program.

2. Description of the Related Art

As computer and network technology has progressed, greater amounts of data have come to be exchanged over networks such as the Internet and the like. The amount of usage of a network is often billed in accordance with used network bandwidth, but there have been problems regarding usage fees in apartments and larger buildings. Dwellers and users of such apartments and larger buildings are sometimes billed by equally dividing the usage fees corresponding to the bandwidth used by the entire apartment or building, even though the amount of use of network bandwidth differs from one user to another. A proposal to address this issue has been made in the form of an Internet connection system wherein network bandwidth which is unused at one room is assigned to another room, and also wherein usage fees are set in accordance with the used network bandwidth (e.g., see Japanese Unexamined Patent Application Publication No. 2006-101563).

SUMMARY OF THE INVENTION

However, with the Internet connection system according to Japanese Unexamined Patent Application Publication No. 2006-101563, efficient network bandwidth assigning cannot be performed in cases wherein there is no unused network bandwidth in the entire apartment our building, leading to competition for network bandwidth.

There has been recognized the need to provide a new and improved bandwidth requesting system, bandwidth requesting device, client device, bandwidth requesting method, content playback method, and program, capable of preventing competition for network bandwidth which can occur on a network.

A bandwidth requesting system according to an embodiment of the present invention includes: a bandwidth requesting device provided to a network to which a plurality of client devices configured to play contents are connected; a router provided externally from the network and connected to the network; and a relay server provided externally from the network and connected to the network via the router; wherein the bandwidth requesting device determines an appropriation request bandwidth based on all bandwidths which the plurality of client devices connected to the network need, and requests the determined appropriation request bandwidth to the relay server via the router; and wherein the relay server determines a bandwidth to appropriate to the network, based on a bandwidth capacity which can be appropriated to the network and the appropriation request bandwidth requested from the bandwidth requesting device, and sends the determined bandwidth to the bandwidth request device, via the router.

The relay server may be a SIP (Session Initiation Protocol) server. According to this configuration, the SIP server which is the relay server manages sessions of the bandwidth requesting device and router connected to the above system, following a protocol stipulated by SIP. SIP is a communication control protocol suitable for establishing and managing real-time multimedia sessions, so using a SIP server as the relay server enables real-time content distribution to be performed efficiently. Note that establishing of a session in SIP means to correlate multiple applications which exist on the network one with another, and to connect multiple applications which exist on the network one with another.

According to an embodiment of the present invention, a bandwidth requesting device connected via a network to a plurality of client devices configured to play contents, and appropriating bandwidths to the plurality of client devices, includes: a bandwidth securement requesting unit for determining a request bandwidth which the network in entirety needs, based on appropriation request bandwidths sent from the plurality of client devices, and requesting a relay server provided externally from the network, for determining bandwidths usable by the network, to secure the request bandwidth; and a communication unit for communicating with the relay server and the plurality of client devices.

The bandwidth requesting device may further include: a request bandwidth determining unit for determining a request bandwidth the network in entirety needs, based on appropriation request bandwidths sent from the plurality of client devices; and a competition resolving unit for, in a case of competition among appropriation request bandwidths sent from the plurality of client devices, resolving the competition.

The competition resolving unit may request from the client devices, regarding which the competition is occurring, a competition resolving policy for competition resolving, each time the competition is to be resolved, and resolve the competition based on the competition resolving policy obtained from the client device, and also distribute the bandwidths appropriated from the relay server to the client devices.

The bandwidth requesting device may further include a competition resolving policy storage unit for storing a competition resolving policy for resolving the competition; wherein the competition resolving unit resolves the competition based on the competition resolving policy stored in the competition resolving storage unit, and distributes bandwidths appropriated from the relay server to the plurality of client devices.

The competition resolving policy storage unit may correlate competition which could occur among the plurality of client devices connected to the network with a corresponding competition resolving policy, and store a plurality thereof.

The bandwidth requesting device may further include a bandwidth state storage unit for storing bandwidths appropriated by the relay server, the bandwidth distribution state at the plurality of client devices, and identification information of the plurality of client devices.

The relay server may be a SIP server. According to this configuration, the bandwidth requesting device requests bandwidth from the SIP server which is a relay server following a protocol stipulated by SIP. SIP is a communication control protocol suitable for establishing and managing real-time multimedia sessions, so the bandwidth requesting device can efficiently request bandwidth from the SIP server which is a relay server.

According to an embodiment of the present invention, a client device connected to a bandwidth requesting device via a network, for playing contents based on a bandwidth which the bandwidth requesting device has acquired, includes: a bandwidth calculating unit for calculating a bandwidth necessary for acquiring the contents; a session establishing unit for establishing a session with a content distribution device which is connected to a relay server provided externally from the network and distributes the contents; a content acquisition unit for acquiring the contents from the content distribution device; a content playback unit for playing the acquired contents; and a communication unit for communicating with the bandwidth requesting device, the relay server, and the content distribution device; wherein the bandwidth calculating unit sends the calculated bandwidth to the bandwidth requesting device, and acquires bandwidth allocated by the bandwidth requesting device; and wherein the session establishing unit establishes a session with the content distribution device, based on the allocated bandwidth.

The relay server may be a SIP server, and the session establishing unit a SIP user agent. According to this configuration, the SIP user agent which is the session establishing unit establishes sessions with the SIP server which is the relay server, following a protocol stipulated by SIP. SIP is a communication control protocol suitable for establishing and managing real-time multimedia sessions, so using a client device having a SIP user agent can efficiently establish sessions with the SIP server which is the relay server.

According to an embodiment of the present invention, a bandwidth requesting method includes the steps of: determining a request bandwidth which a network needs in entirety, based on appropriation request bandwidths sent from a plurality of client devices, which play contents, connected to the network; and requesting a relay server provided externally from the network, for determining bandwidths usable by the network, to secure the request bandwidth.

According to an embodiment of the present invention, a content playing method for playing contents based on a bandwidth which a bandwidth requesting device connected via a network has acquired, includes the steps of: calculating a bandwidth necessary for acquiring the contents, and requesting the bandwidth to the bandwidth requesting device; establishing a session with a content distribution device which is connected to a relay server provided externally from the network and distributes the contents, based on the bandwidth allocated by the bandwidth requesting device; acquiring the contents from the content distribution device; and playing the acquired contents.

According to an embodiment of the present invention, a program causes a computer, for controlling a bandwidth requesting device connected via a network to a plurality of client devices configured to play contents and appropriating bandwidths to the plurality of client devices, to realize: a bandwidth securement requesting function for determining a request bandwidth which a network needs in entirety, based on appropriation request bandwidths sent from a plurality of client devices, which play contents, connected to the network, and requesting a relay server provided externally from the network, for determining bandwidths usable by the network, to secure the request bandwidth; and a communication function for communicating with the relay server and the plurality of client devices.

According to this configuration, the computer program is stored in a storage unit provided to the computer, and is read in to a CPU provided to the computer and executed, so as to cause the computer to function as the aforementioned bandwidth requesting device. Also, a computer-readable recording medium in which the computer program has been recorded can be provided. Examples of the recording medium include a magnetic disk, optical disc, magneto-optical disc, flash memory, or the like. Also, the above computer program may be distributed via network for example, without using a recording medium.

According to an embodiment of the present invention, a program causes a computer, for controlling a client device connected to a bandwidth requesting device via a network for playing contents based on a bandwidth which the bandwidth requesting device has acquired, to realize: a bandwidth calculating function for calculating a bandwidth necessary for acquiring the contents, and sending the calculated bandwidth to the bandwidth requesting device; a session establishing function for establishing a session with a content distribution device which distributes the contents, based on the bandwidth allocated by the bandwidth requesting device; a content acquisition function for acquiring the contents from the content distribution device; a content playback function for playing the acquired contents; and a communication function for communicating with the bandwidth requesting device and the content distribution device.

According to this configuration, the computer program is stored in a storage unit provided to the computer, and is read in to a CPU provided to the computer and executed, so as to cause the computer to function as the aforementioned client device. Also, a computer-readable recording medium in which the computer program has been recorded can be provided. Examples of the recording medium include a magnetic disk, optical disc, magneto-optical disc, flash memory, or the like. Also, the above computer program may be distributed via network for example, without using a recording medium.

According to the above-described configurations of embodiments of the present invention, competition for network bandwidth which can occur on a network can be prevented beforehand.

BRIEF DESCRIPTION OF THE DRAWINGS

FIGS. 21A through 21C are explanatory diagrams for describing a method for determining bandwidth capacity in bandwidth management status information according to the embodiment.

DESCRIPTION OF THE PREFERRED EMBODIMENTS

Figure 1:
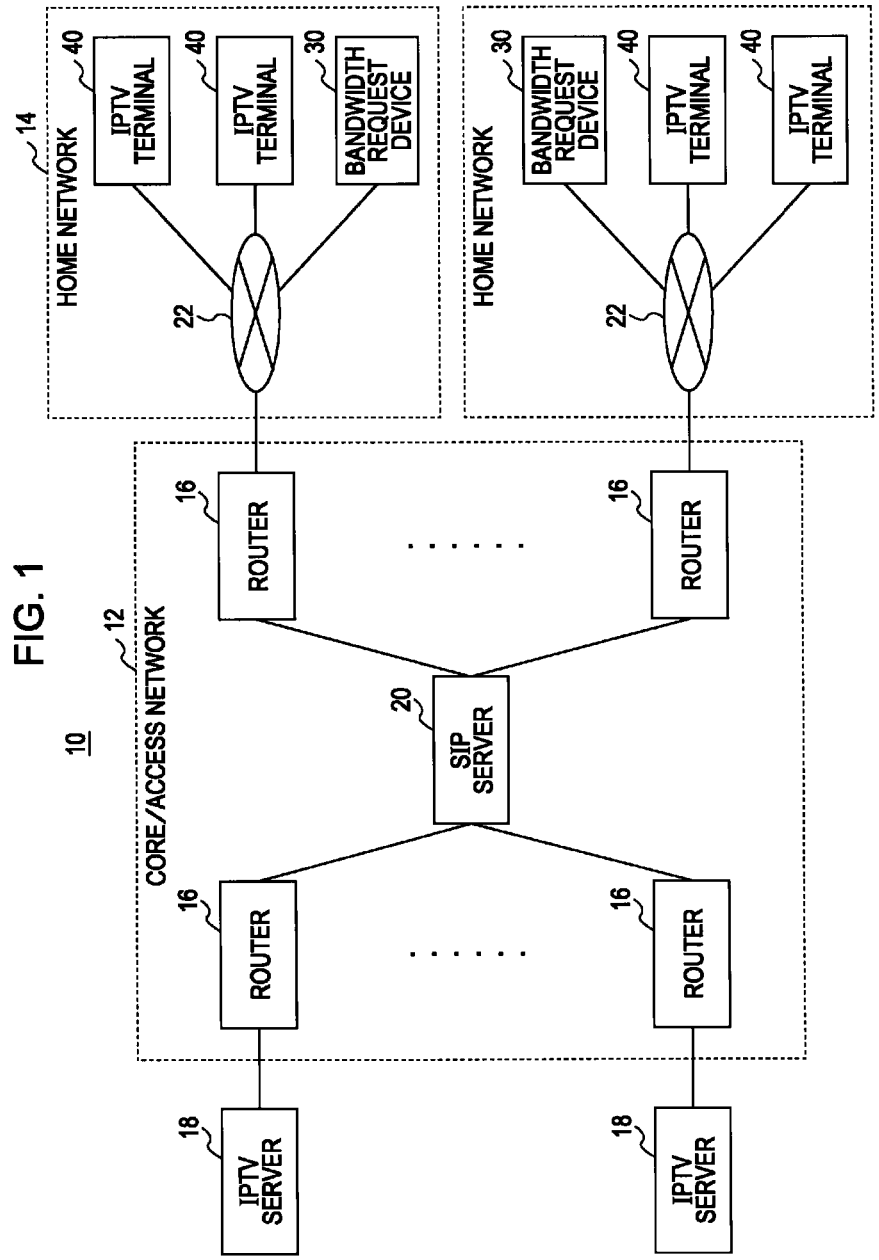
FIG. 1 is an explanatory diagram illustrating a bandwidth requesting system 10 according to an embodiment of the present invention.

Embodiments of the present invention will be described in detail below with reference to the attached drawings. Note that with the present Specification and drawings, components which have substantially the same functional configuration will be denoted with the same reference numerals, so as to omit redundant description.

First Embodiment

The following is a detailed description of a bandwidth requesting system according to a first embodiment of the present invention. Note that description will be made of an example of the content distribution device by way of an IPTV server which distributes IPTV (Internet Protocol TeleVision) contents. Also, a case will be described using a SIP server as the relay server. Further, description will be made of an example of the client device by way of an IPTV terminal for playing IPTV contents.

FIG. 1 is an explanatory diagram illustrating a bandwidth requesting system 10 according to the present embodiment. The bandwidth requesting system 10 includes, for example, a core/access network 12, home networks 14, and IPTV servers 18 which are content distribution devices.

The core/access network 12 is a network for intermediating between the home networks 14 and the IPTV servers 18, and includes multiple routers 16, and a SIP server 20 which is a relay server as to the home network 14. The core/access network 12 and the home networks 14 are connected via routers 16, and the IPTV servers 18 and the core/access network 12 are connected via routers 16.

The routers 16 are devices for relaying data flowing through the bandwidth requesting system 10 made up of the core/access network 12, home networks 14, and IPTV servers 18. As shown in FIG. 1, the core/access network 12 has disposed therein multiple routers 16, with one end of these multiple routers being connected to a later-described SIP server 20. Also, the other end of the routers 16 is connected to home networks 14 or IPTV servers 18. While the example in FIG. 1 shows the multiple routers 16 being connected to a single SIP server 20, the invention is not restricted to this example, and the routers 16 may be connected to multiple SIP servers 20. Also, while the example in FIG. 1 shows one IPTV server 18 being connected to one router 16, but the invention is not restricted to this example, and multiple IPTV servers 18 may be connected to one router 16.

The IPTV servers 18 are content distribution devices, which manage IPTV data which is contents, and also distribute IPTV video/audio media streams as to IPTV terminals 40 which are client devices, in response to requests from the IPTV terminals 40. An IPTV server 18 may be a content providing server, or may be a broadcasting station or the like.

The SIP server 20 is a server which uses SIP as a communication control protocol. It is sufficient for the SIP server 20 to be provided on the core/access network 12, and may be provided on the core network or may be provided on the access network. The SIP server 20 controls the routers 16 connected to the SIP server 20, and the IPTV servers 18 and IPTV terminals 40 indirectly connected to the SIP server 20 via router 16.

A communication network 22 is a communication network for connecting the routers 16, a bandwidth requesting device 30, and multiple IPTV terminals 40, bi-directionally communicably or unidirectionally communicably. This communication network is configured as, for example, a public line network such as the Internet, telephone line network, satellite communication network, multicasting communication path, and so forth, or a dedicated line network such as a WAN (Wide Area Network), LAN (Local Area Network), IP-VPN (Internet Protocol-Virtual Private Network), Ethernet (Registered Trademark), wireless LAN, and so forth, and may be either cable or wireless. Also, the bandwidth requesting device 30 and IPTV terminals 40 may be directly connected to routers 16 by, for example, a USB (Universal Service Bus) port, IEEE 1394 port such as i.LINK or the like, SCSI (Small Computer System Interface) port, RS-232C port, or the like, without going through the communication network 22.

The bandwidth requesting device 30 is a device which requests bandwidth necessary for the multiple IPTV terminals connected to a home network 14 to play IPTV, which is contents, to the SIP server 20 and receive appropriation of bandwidth from the SIP server 20. In FIG. 1, one bandwidth requesting device 30 is connected to one home network 14, but the invention is not restricted to this example, and multiple bandwidth requesting devices 30 may be connected to one home network 14 with processing being scattered therebetween. The bandwidth requesting device 30 may also have the functions of the IPTV terminal 40.

The bandwidth requesting device 30 will suffice as long it is capable of communication with the SIP server 20 and IPTV terminals 40 via the network, and may be configured of, for example, a personal computer (PC) or like computer device (regardless of whether notebook type or desktop type). This bandwidth requesting device 30 will be described in detail below.

An IPTV terminal 40 is a client device which receives IPTV distribution which is contents from an IPTV server 18 which is a content distribution device, and plays the IPTV. In FIG. 1, two IPTV terminals 40 are shown connected to one home network 14, but the invention is not restricted to this example, and an arrangement may be wherein one IPTV terminal 40 is connected to one home network 14, or wherein three IPTV terminals 40 are connected to one home network 14.

An IPTV terminal 40 will suffice as long as it is a device having communication functions over a network, and is capable of playing IPTV, and may be configured of, for example, a personal computer (PC) or like computer device (regardless of whether notebook type or desktop type), a television receiver, a cellular phone, a PDA (Personal Digital Assistant), a television broadcasting tuner or decoder, or the like. Also, the IPTV terminal 40 may be a portable device which a subscriber can carry, such as a portable gaming console, a PHS (Personal Handyphone System) device, a portable video/audio player, or the like. This IPTV terminal 40 will be described in detail below.

(Configuration of Bandwidth Requesting Device 30, IPTV Terminal 40)

Figure 2:
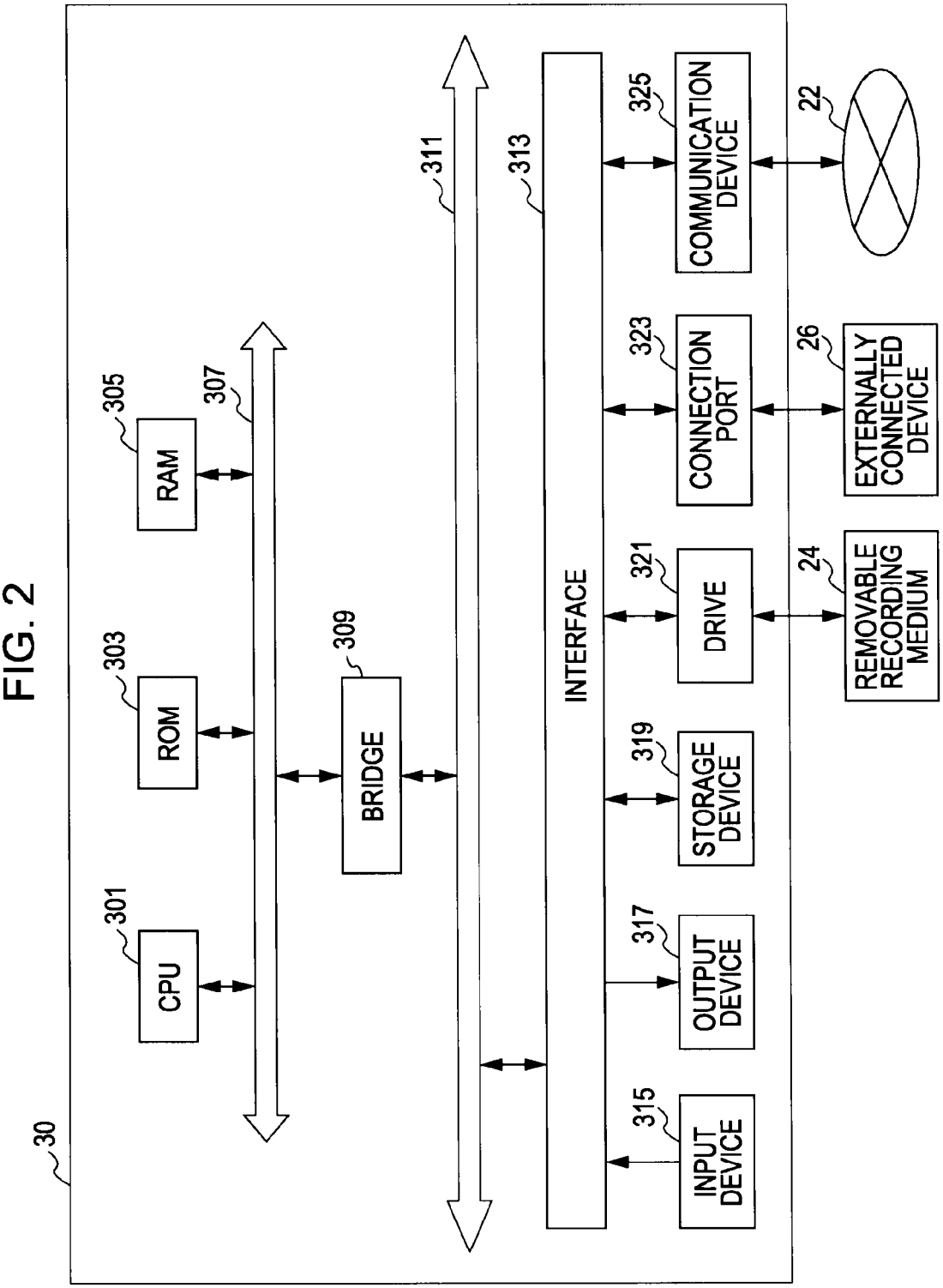
FIG. 2 is a block diagram illustrating the hardware configuration of a bandwidth requesting device 30 according to the embodiment.

FIG. 2 is an explanatory diagram illustrating the hardware configuration of the bandwidth requesting device 30 according to the present embodiment. The bandwidth requesting device 30 primarily includes a CPU (Central Processing Unit) 301, ROM (Read Only Memory) 303, RAM (Random Access Memory) 305, a host bus 307, a bridge 309, an external bus 311, an interface 313, and input device 315, and output device 317, a storage device 319, a drive 321, a connection port 323, and a communication device 325.

The CPU 301 functions as a computing processing device and control device, and controls all or a part of the operations within the bandwidth requesting device 30, following various types of programs stored in the ROM 303, RAM 305, storage device 319, or removable storage medium 24. The ROM 303 stores programs, computation parameters, and so forth, which the CPU 301 uses. The RAM 305 temporarily stores programs used in execution of the CPU 301 and parameters or the like which change as appropriate in the execution thereof. These are mutually connected by the host bus 307 configured of internal busses such as a CPU bus and so forth. The host bus 307 is connected to the external bus 311 such as a PCI (Peripheral Component Interconnect/Interface) bus or the like, via the bridge 309.

The input device 315 is an operating device or unit which the user operates, such as a mouse, keyboard, touch panel, buttons, switches, levers, or the like, for example. Also, the input device 315 may be, for example, a remote controlling device (a so-called remote controller) using infrared or other radio waves, or may be an externally connected device 26 such as a cellular phone or PDA or the like compatible with the operations of the bandwidth requesting device 30, or may be an IPTV terminal 40. Further, the input device 315 is configured of an input control circuit and so forth, which generates input signals based on information input from the user using the above-described operating devices or units, and outputs to the CPU 301, for example. The user of the bandwidth requesting device 30 can input various types of data and instruct processing operations to the bandwidth requesting device 30 by operating the input device 315.

The output device 317 can be configured as, for example, a display device such as a CRT (Cathode Ray Tube) display device, LCD (Liquid Crystal Display) device, PDP (Plasma Display Panel) device, EL (Electro-Luminescence) display device, lamps, and so forth, an audio output device such as a speaker or headphones or the like, or a printer device, cellular phone, facsimile, or the like, which visually or audibly notifies the user of acquired information.

The storage device 319 is a data storage device configured as an example of the storage unit of the bandwidth requesting device 30 according to the present embodiment, examples of which include, but are not restricted to, a magnetic storage device such as a HDD (Hard Disk Drive) or the like, a semiconductor storage device, an optical storage device, and a magneto-optical storage device. The storage device 319 stores programs to be executed by the CPU 301, various types of data, contents, content information and content metadata necessary for executing contents, content data acquired externally, and so forth.

The drive 321 is a storage medium reader/writer, which is built into or externally attached to the bandwidth requesting device 30. The drive 321 reads out information recorded in the removable recording medium 24, and outputs to the RAM 305. Also, the drive 321 can write records to the removable recording medium 24. Examples of the removable recording medium 24 include, but are not restricted to, a mounted magnetic disk, optical disc, magneto-optical disc, semiconductor memory, or the like, more specific examples thereof including DVD media, HD-DVD media, Blu-ray media, CF (CF) memory sticks, SD (Secure Digital) memory cards, and so forth. Also, the removable recording medium 24 may be an IC (Integrated Circuit) card or electronic device or the like including a non-contact type IC chip.

The connection port 323 is a port for directly connecting the device to the bandwidth requesting device 30, such as a USB (Universal Service Bus) port, IEEE 1394 port such as i.LINK or the like, SCSI (Small Computer System Interface) port, RS-232C port, or the like, optical audio terminal, or the like. Connecting the externally connected device 26 to the connection port 323 enables the bandwidth requesting device 30 to directly acquire content data from the externally connected device 26 and provide various types of data to the externally connected device 26.

The communication device 325 is a communication interface configured of a communication device and the like for connected to the communication network 22, for example. The communication device 325 is, for example, a communication card for cable or wireless LAN (Local Area Network), Bluetooth, or WUSB (Wireless USB), an optical communication router, an ADSL (Asymmetric Digital Subscriber Line) router, or modems or the like for various types of communication. This communication device 325 exchanges contents or information relating to contents with the client devices 40, and can also exchange contents and metadata and the like relating to contents over the Internet or with other communication devices. Also, the communication network 22 to which the communication device 325 is connected is configured of a cable or wirelessly connected network or the like, and may be, for example, the Internet, a home LAN, infrared communication, satellite communication, or the like.

Due to the configuration described above, the bandwidth requesting device 30 can acquire various types of information from a wide variety of information sources such as the IPTV server 18, SIP server 20, IPTV terminal 40, and so forth, and can send information. Further, the bandwidth requesting device 30 and also check out various types of information which the bandwidth requesting device 30 holds, using the removable recording medium 24. Thus, an excellent digital home network is configured using a bandwidth requesting device 30 and IPTV terminals 40 compatible therewith. Note that the hardware configuration of the IPTV terminal 40 is substantially the same as the hardware configuration of the bandwidth requesting device 30, so description will be omitted.

An example of hardware configuration capable of realizing the functions of the bandwidth requesting device 30 and IPTV terminal 40 according to the present embodiment has been described above. The components above may be configured using general-purpose materials, or may be configured as hardware specialized for the functions of each of the components. Accordingly, the hardware configuration to be used can be modified as appropriate in accordance with the technical level for implementation of the present embodiment at that time. Also, the above-described hardware configuration is but an example, and it is needless to say that the invention is not restricted to this. Also, depending on the usage form, the host bus 307, external bus 311, interface 313, or the like, can be omitted.

(Configuration of Router 16)

Figure 3:
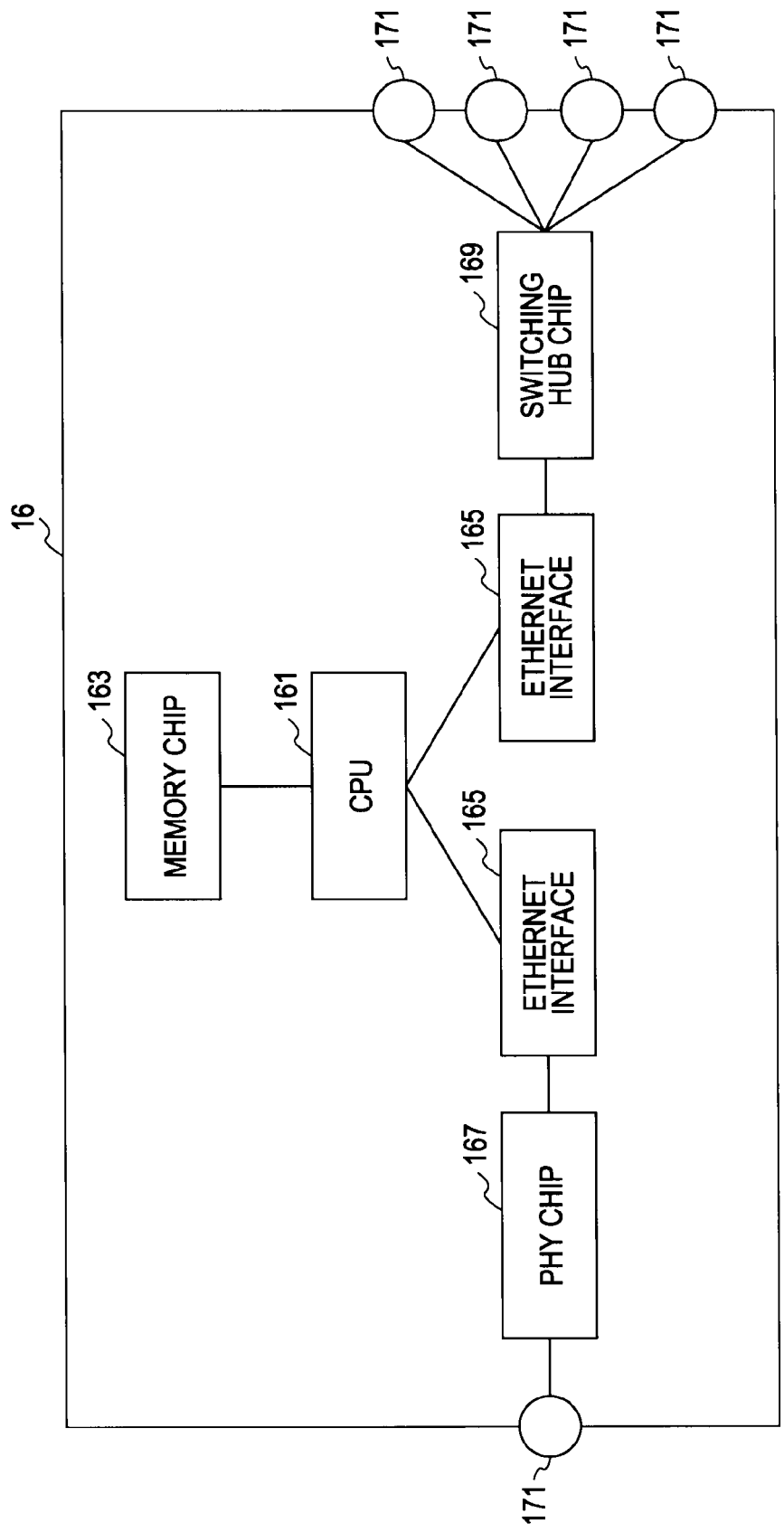
FIG. 3 is a block diagram illustrating the hardware configuration of a router according to the embodiment.

FIG. 3 is an explanatory diagram illustrating the hardware configuration of the router 16 according to the present embodiment. The router 16 primarily includes a CPU 161, a memory chop 163 configured of ROM and RAM, an Ethernet interface 165, a PHY chip 167, a switching hub chip 169, and a connection port 171.

The CPU 161 functions as a computing processing device and control device, and controls all or a part of the operations within the router 16, following various types of programs stored in the memory chop 163 configured of ROM or RAM, and performs IP packet routing processing. The ROM configuring the memory chip 163 stores programs, computation parameters, and so forth, which the CPU 161 uses. The RAM configuring the memory chip 163 temporarily stores programs used in execution of the CPU 161 and parameters or the like which change as appropriate in the execution thereof. These are mutually connected by the host bus configured of internal busses such as a CPU bus and so forth.

The Ethernet interface 165 intermediates between various types of data sending formats outside of the router 16, and the data sending format within the router 16. As shown in FIG. 3, two Ethernet interfaces 165 are provided; one provided between the CPU 161 and later-described PHY chip 167 for intermediating data sent externally from the router 16 into the router 16, and the other provided between the CPU 161 and later-described switching hub chip 169 for intermediating data sent from within the router 16 to outside of the router 16. Note that while FIG. 3 illustrates a case of provided two Ethernet interfaces within the router 16, the invention is not restricted to the above example, and the above-described functions may be carried out with a single Ethernet interface.

The PHY (PHYsical layer) chip 167 is a chip including information regarding the physical connection/transmission format of the network to which the router 16 is connected, with information relating to, for example, the format for mutually converting data and electrical signals, and so forth, included. This PHY chip 167 is provided between the connection port 171 provided upstream from the router 16, and the Ethernet interface 165.

The switching hub chip 169 is a chip having functions of a hub (line concentrator), for analyzing data sent to the router 16 and detecting the sending destination of the data, and sending the data to only the appropriate connection port 171 based on the MAC address or the like for the sending destination for example. This switching hub chip 169 is provided between the connection ports 171 provided downstream from the router 16, and the Ethernet interface 165.

An example of a hardware configuration capable of realizing the functions of the router 16 according to the present embodiment has been described above. The components above may be configured using general-purpose materials, or may be configured as hardware specialized for the functions of each of the components. Accordingly, the hardware configuration to be used can be modified as appropriate in accordance with the technical level for implementation of the present embodiment at that time. Also, the above-described hardware configuration is but an example, and it is needless to say that the invention is not restricted to this.

(Description of Fundamental Technology: Competition Resolving Processing Customized to SIP Server)

First, before giving detailed description of the present embodiment, technological issues underlying the present embodiment will be described. Note that the present embodiment has been configured such that improvements to the fundamental technology described below can yield even more marked advantages. Accordingly, the technology relating to the improvements made to the fundamental technology in fact make up the very features of the present embodiment. That is to say, while the present embodiment adheres to the basic concepts of the technological issues described here, the essence thereof is rather concentrated in the portions dealing with improvement, and it should be noted that the configurations thereof clearly differ, and that the advantages thereof are in clear contrast with those of the fundamental technology.

Figure 4:
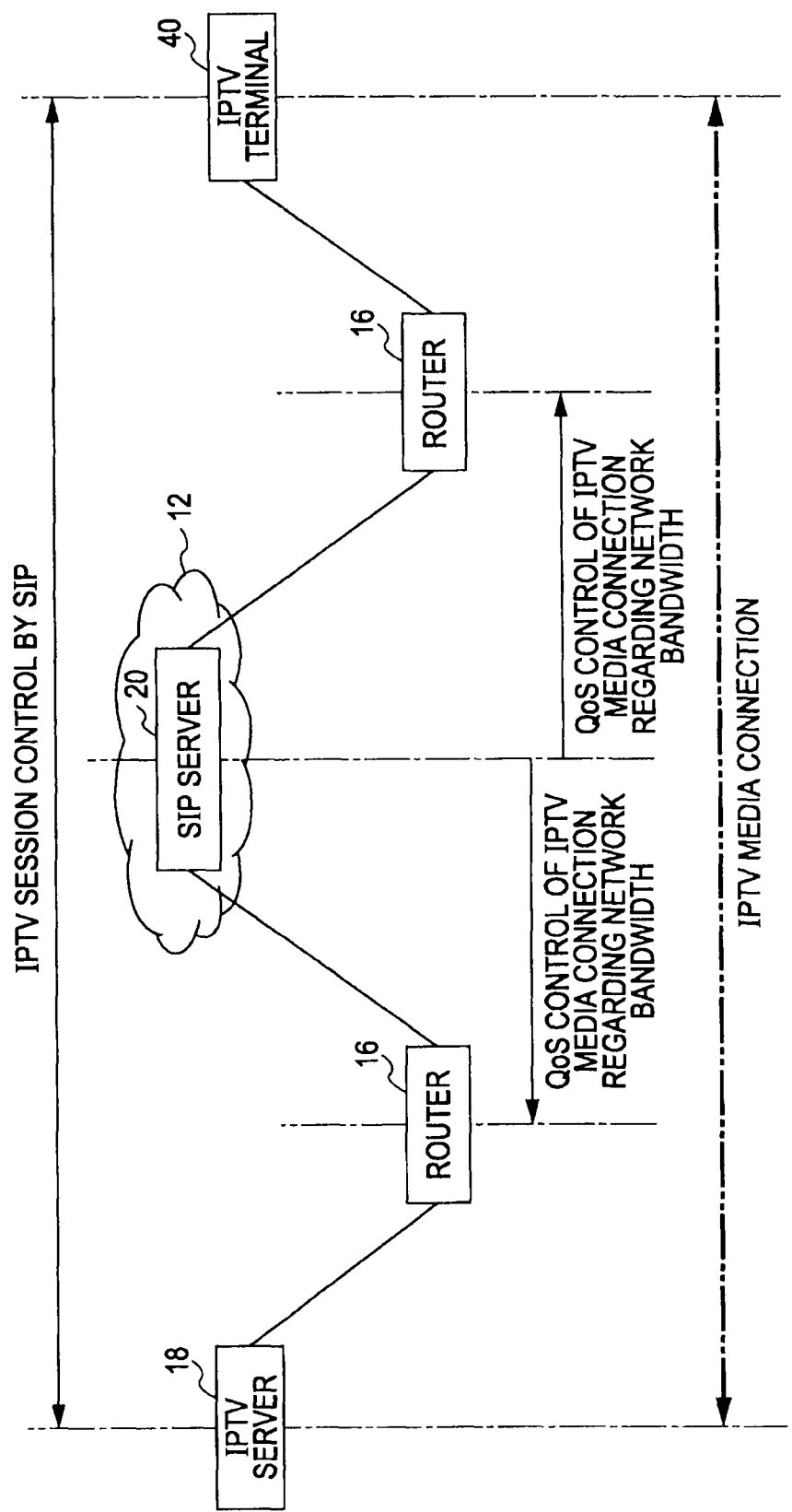
FIG. 4 is an explanatory diagram for describing a content distribution system according to the fundamental technology underlying the present invention.

FIG. 4 is an explanatory diagram for describing a content distribution system according to the fundamental technology of the present invention. In FIG. 4, description is made by way of an example of IPTV service, which is expected to be implemented as a keystone application on the next-generation IP (Internet Protocol) network realized by IMS (IP Multimedia Subsystem)/NGN (Next Generation Network).

The content distribution system according to the fundamental technology of the present invention includes, for example, a core/access network 12, and an IPTV server 18 and IPTV terminal 40 connected to the core/access network 12 via routers 16.

With the IPTV service, SIP (Session Initiation Protocol) capable of QoS (Quality of Service) negotiation regarding bit rate and so forth necessary for communication between the IPTV application server 18 for distributing contents and the IPTV terminal 40 for playing the contents, so as to perform establishing/releasing control of IPTV sessions such as VOD (Video On Demand) streaming and so forth, regarding which QoS is ensured. In the example shown in FIG. 4, session control between the IPTV server 18 and the IPTV terminal 40, and control between the SIP server 20 and routers 16, is performed with SIP. Note that the solid arrows in the diagram represent the flow of session control information, and that the two-dot broken lines in the drawing represent the media stream of content data or the like.

Now, the above QoS is a technology for reserving a bandwidth for a certain communication, and ensuring a certain communication speed. Also, the above VOD means a service whereby desired video contents can be viewed whenever desired.

The SIP server 20 for intermediating message exchanging interprets the contents of SIP messages for session control, and controls network devices regarding which QoS control is available, such as the routers 16 and so forth on the IPTV media connection path. QoS negotiation-capable SIP enables the most suitable of multiple classes (quality classes by difference in media encoding type, bit rate, and so forth) of IPTV media to be selected by negotiation between both the IPTV application server 18 and IPTV terminal 40, taking into consideration the state of network traffic and so forth.

Figure 5:
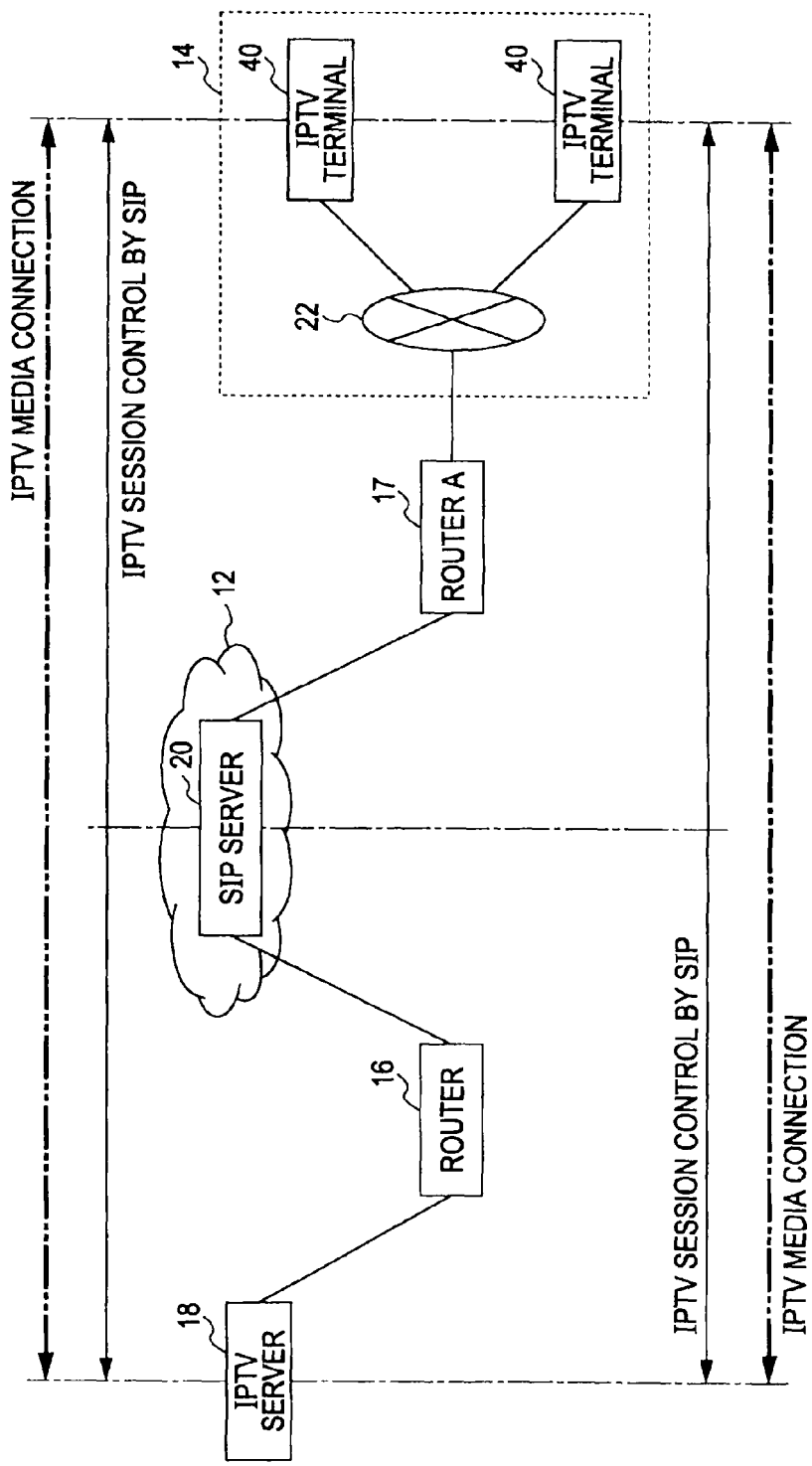
FIG. 5 is an explanatory diagram for describing a content distribution system according to the fundamental technology.

As shown in FIG. 5, we will say that a network device such as a router A17 capable of QoS control or the like is provided at the boundary between the home network 14 and the core/access network 12 at the next-generation IP network side realized by IMS/NGN, with two IPTV terminals 40 being connected on the communication network 22 which is a home network segment. With the configuration shown in FIG. 5, the network side (i.e., the core/access network 12 side) manages the SIP server 20 and router A17. Also note that while in FIG. 5, only two IPTV terminals are connected to the communication network 22, but only one IPTV terminal 40 may be connected, or multiple IPTV terminals 40 may be connected.

Figure 6:
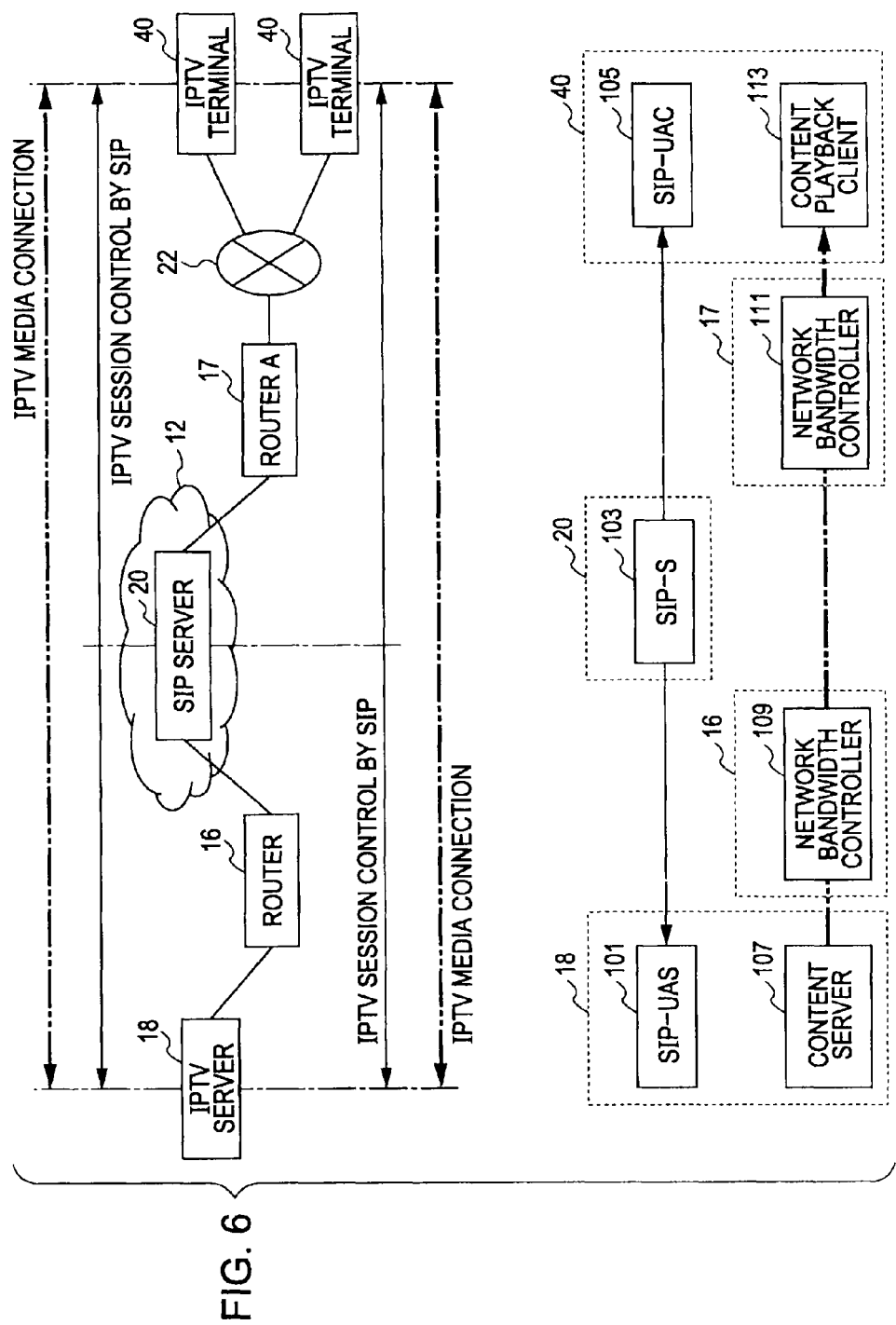
FIG. 6 is an explanatory diagram for describing a content distribution system according to the fundamental technology.

As shown in FIG. 6, in the IMS/NGN architecture, at the time of establishing an IPTV session, the SIP-UAC (SIP/User Agent Client) 105 implemented at the IPTV terminal 40 side issues a message to the SIP-UAS (SIP/User Agent Server) 101 implemented at the IPTV server 18 side, asking for establishing of an IPTV video/audio media stream session. This message is delivered from the SIP-UAC 105 to the SIP-UAS 101 via the SIP-S (SIP Server) 103, and at this time, the SIP-S 103 asks a network bandwidth controller 109 implemented in a QoS control-capable network device (router 16, etc.) situated between a content playback client 113 (media stream playing function) implemented at the IPTV terminal 40 and content server 107 (media stream delivering function) implemented at the IPTV server 18 to ensure necessary network resources such as bandwidth (the flow of arrows shown in FIG. 6 with solid lines).

Now, the network bandwidth controllers 109 and 11 implemented in the routers 16 are for securing and releasing bandwidth necessary for sending content data from the content server 107 to the content playback client 113, as described above.

Upon bandwidth necessary for content distribution being secured between the content server 107 provided to the IPTV server 18 and the content playback client 113 provided to the IPTV terminal 40 by the network bandwidth controller 109 implemented in the router 16, the content server 107 uses the secured bandwidth to distribute content data made up of video data and audio data to the content playback client 113 (the flow of arrows shown in FIG. 6 with two-dot broken lines).

Note that SIP is based on a client-server model between end systems, and the above user agents (which may be abbreviated to "UA") correspond to these end systems. A user agent functions both as a client and a server, with a user agent in a case of generating a request being called a user agent client (UAC) and a user agent in a case of processing a request from another user agent and generating a response is called a user agent server (UAS). Also, the above SIP-S (SIP server) is a device for providing various services to user agents, such as relaying requests and responses, inquiries regarding destinations of requests, registration of location information on the network of user agents, and so forth.

In a case of multiple IPTV terminals 40 situated on a certain home network 14 simultaneously attempting to establish a session with an IPTV server 18, the SIP-UACs 105 of the multiple IPTV terminals 40 ask the SIP-S 103 of the core/access network 12 to establish a session. However, in this case, there is the possibility that vying (competing) for bandwidth, which is a network resource, may occur in this case. In such a case, the SIP-S 103 negotiates the requests of the multiple IPTV terminals 40, based on a competition resolving policy determined beforehand.

Figure 7:
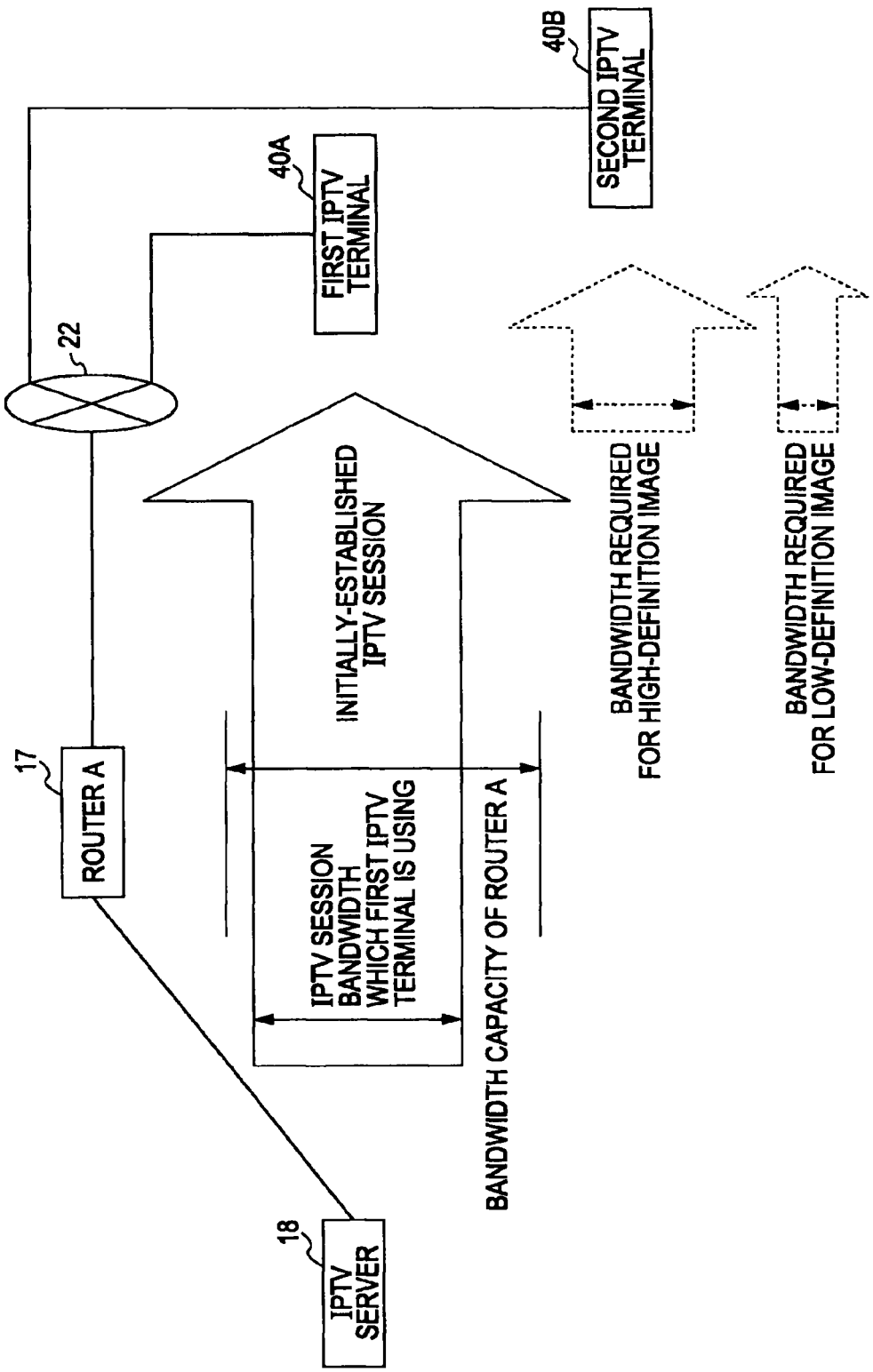
FIG. 7 is an explanatory diagram for describing a content distribution system according to the fundamental technology.

For example, a case can be conceived wherein, as shown in FIG. 7, a first IPTV terminal 40A situated in a certain home network 14 has already established connection with high definition (High Definition class) IPTV media, and in this state, a second IPTV terminal 40B which is connected to the same home network segment 14 further attempts to establish connection to the high definition IPTV media. In this case, as shown in FIG. 7, there may be a case wherein the media connection which the first IPTV terminal 40A has already established has almost used up all of the bandwidth capacity of the router A 17 (with a slight leeway). In such a case, the SIP-S 103 can conceivably employ the following several competition resolving policies.

(Policy 1) In a case wherein there is no leeway to accommodate the session of the class requested from the second IPTV terminal 40 left in the bandwidth capacity of the network of the router A 17, and the priority (priority class) of the first IPTV terminal 40A is set high, the IPTV media session establishing request from the second IPTV terminal 40B is not accepted.

(Policy 2) In a case wherein the IPTV media session from the second IPTV terminal 40B is a session regarding which selection can be made from the two QoS classes of high definition class and low definition class, and there is leeway in the bandwidth capacity of the router A 17 for accommodating the low definition class session, the IPTV session establishing request from the second IPTV terminal 40B is established as a low definition class session while maintaining the IPTV session from the first IPTV terminal 40A.

(Policy 3) In a case wherein there is no leeway to accommodate the session of the class requested in the bandwidth capacity of the network of the router A 17, and the priority (priority class) of user using the second IPTV terminal 40B is set high, the IPTV session from the first IPTV terminal 40A is stopped, and IPTV session from the second IPTV terminal 40B is established at the requested definition.

Policies for resolving bandwidth request competition from multiple terminals 40 at the time of establishing sessions will be referred to as "bandwidth request competition resolving policy". In addition to these selections, day-of-the-week, time-of-the-day, type of content being viewed/listened to (sports coverage), etc., or combined conditions thereof, can be conceived as complex policies to take into consideration. Also, in addition to cases for resolving with predefined policies (hereafter referred to as "automatic competition resolving"), there can be conceived cases wherein the user is notified of each competition detected for each session establishing request, and the competition is resolved in accordance with the intent of the user at each time (hereafter referred to as "on-the-fly interactive competition resolving") is expected.

(Description Regarding the Present Embodiment)

However, in the case of performing such bandwidth request competition resolving at the network side (i.e., at the core/access network 12 side), policies for competition resolving must be managed for individual IPTV terminals 40 included in each individual home network, and each user thereof. The SIP server 20 references a competition resolving database 21 which is a database centrally managing these competition resolving policies for each session establishing request from the IPTV terminals 40, resolves competition following preset competition resolving policies in the case of automatic competition resolving, and resolves competition following carrying conformation processing of the intent of individual users in the case of on-the-fly interactive competition resolving.

Figure 8:
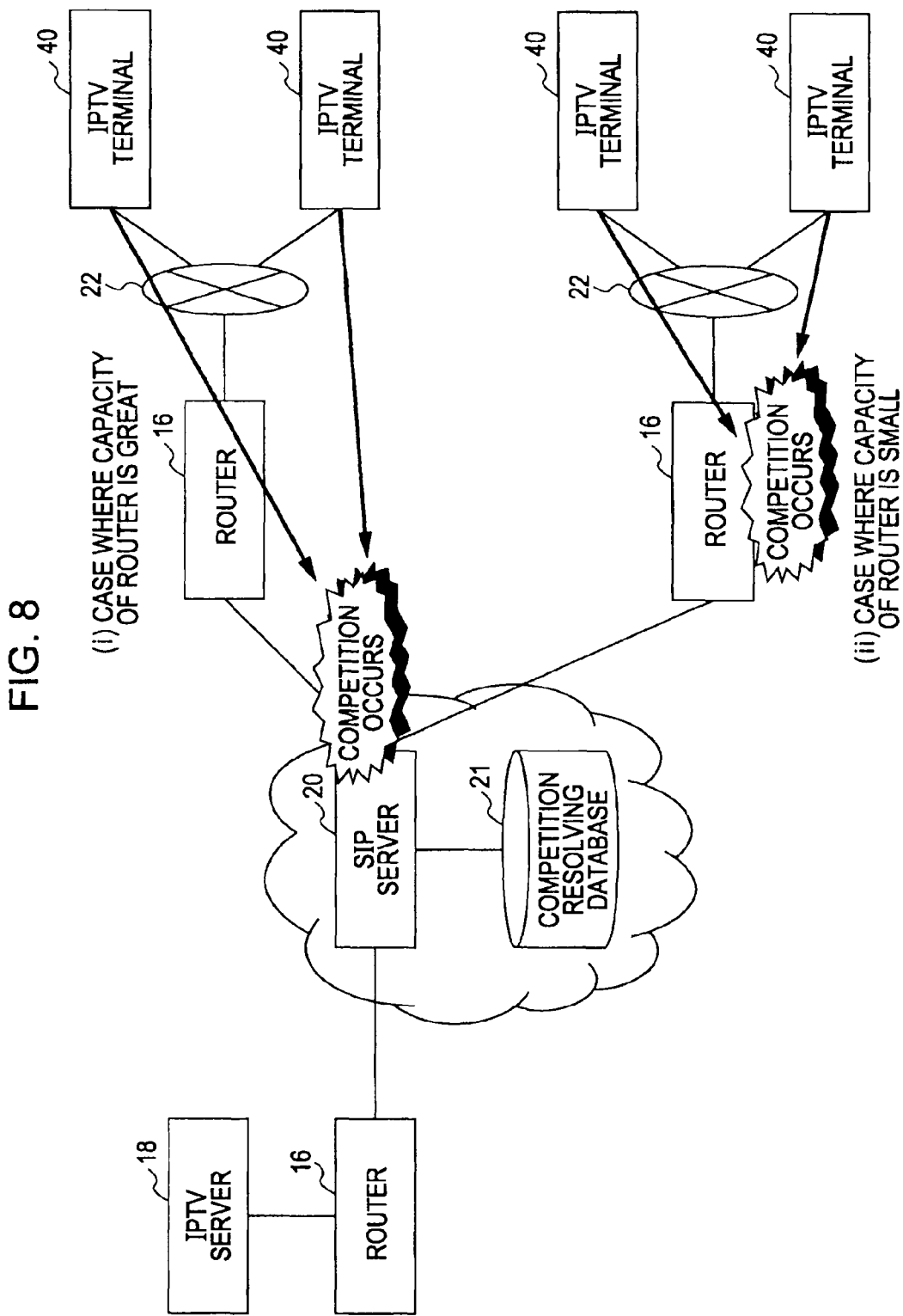
FIG. 8 is an explanatory diagram for describing a content distribution system according to the fundamental technology.

In the event of performing such competition resolving at the core/access network 12 side, a problem may occur wherein, in the event of a blanket simultaneous type IPTV session, such as a live coverage of an event or the like, or a blanket release VOD or the like, competition resolving processing occurs all at once for a great number of home networks, resulting in the competition resolving processing load on the network side suddenly increasing, thereby destabilizing performance (competition occurring at the router 16 in FIG. 8). Further, in the event that the bandwidth capacity of the router 16 situated at the boundary of the home network is small, the IPTV terminals 40 which share the bandwidth capacity will be vying for the bandwidth capacity, so the CIP server 20 needs to negotiate this vying. This can lead to a problem in that this negotiation increases the processing load of the SIP server 20.

On the other hand, in the event that the bandwidth capacity of the router 16 situated at the boundary of the home network is great, the possibility of vying for bandwidth within the home network 14 is small, and there is no need for competition resolving beforehand, so all session establishing requests from the multiple IPTV terminals 40 within the same home network 14 will be permitted. In the event that a great number of home networks are connected to such a router, and session establishing requests from all of the IPTV terminals 40 are permitted almost simultaneously, there is the possibility that the network bandwidth capacity of the core/access network 12 itself will overflow, or the capacity of the IPTV server 18 overflow. In this case as well, the load for competition resolving may be concentrated at the SIP server 20, leading to overflow of the SIP server 20 (competition occurring at the SIP server 20 in FIG. 8).

Figure 9:
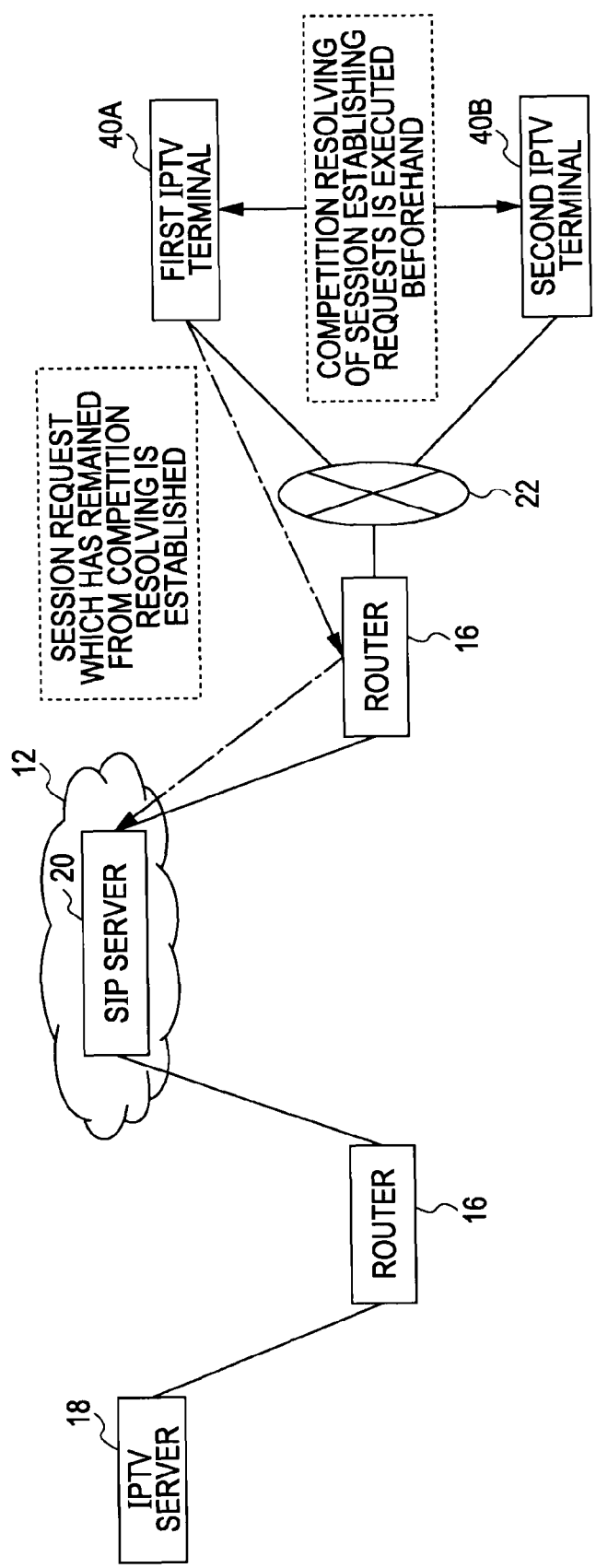
FIG. 9 is an explanatory diagram illustrating a bandwidth requesting system 10 according to an embodiment of the present invention.

The Present Inventor has diligently studied the above issues, and accordingly has reached the following solution. In order to solve the competition problem at the router 16 above, a method can be conceived wherein, prior to individual IPTV terminals 40A and 40B sending session establishing requests to the SIP server 20 (in the event that there is an IPTV terminal 40 which has already established a session, before another IPTV terminal 40 within the home network 14 sending a new session establishing request), the IPTV terminals 40 within the home network 14 resolve the bandwidth competition at the boundary router 16 of the home network 14 by themselves, as shown in FIG. 9.

Also, the above problem of competition at the SIP server 20 can be avoided by competition resolving within the home network 14 beforehand. However, for this to work, the upper limit of network bandwidth usable within the home network 14 at any given time must be known, or competition resolving processing cannot be performed. The network bandwidth usable at any given time can be referenced from bandwidth management information at the network side which the SIP server 20 can reference, so if the SIP server 20 side can periodically notify the IPTV terminals 40 side of the bandwidth consumption state, the IPTV terminals 40 can resolve competition among themselves in the home network 14 beforehand, before sending session establishing requests with SIP.

Also, the probability of competition resolving policy patterns provided at the network side being such that is very general and common to many users is high, so defining detailed competition resolving policies customized to individual home network environments is difficult. If a system can be realized wherein competition resolving is carried out locally at the home network 14 side as described above, resolving competition applying such detailed resolving policies can be readily realized.

The Present Inventor has diligently studied these issues to realize the above competition resolving method, and has developed a bandwidth requesting system 10 and bandwidth requesting device 30 as described below.

The bandwidth requesting system 10 according to an embodiment of the present invention has a bandwidth request competition resolving agent, which operates based on the newest network bandwidth management information within the network notified on-the-fly from the network side (core/access network 12 side) server (SIP server 20), situated at the home network 14 side, thereby alleviating or completely taking over increased load of competition resolving provided at the network side.

Also, a feature is that not only general competition resolving policy definitions provided at the core/access network side, but also detailed competition resolving policies depending on individual home network environments can be defined in the competition resolving policy storage unit which the bandwidth request competition resolving agent refers for competition resolving.

The bandwidth requesting system 10 and bandwidth requesting device 30 according to the present embodiment will now be described, based on the fundamental technology described so far. The bandwidth requesting system 10 according to the present embodiment is a system using SIP used with the above fundamental technology, which periodically notifies the client device side of the state of usable network resources (bandwidth) that changes in a constantly-varying manner, based on bandwidth management information of the network side core/access network side) which the SIP server 20 can reference.

(Configuration of Bandwidth Requesting System 10)

Figure 10:
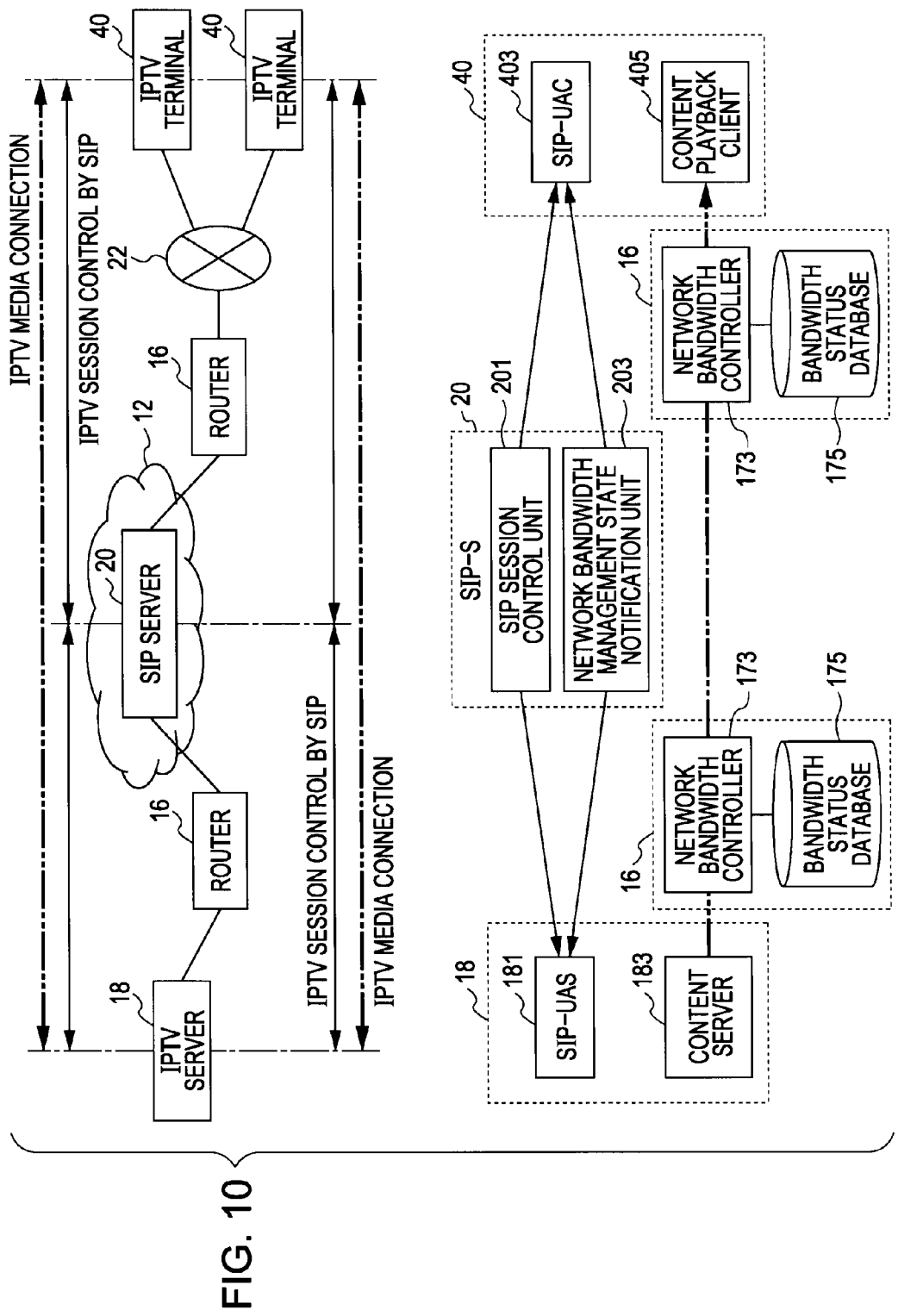
FIG. 10 is an explanatory diagram illustrating the configuration of the bandwidth requesting system 10 according to the embodiment.

First, the configuration of the bandwidth requesting system 10 according to the present embodiment will be described in detail with reference FIG. 10. FIG. 10 is an explanatory diagram illustrating the configuration of the bandwidth requesting system 10 according to the present embodiment.

The bandwidth requesting system 10 according to the present embodiment includes, for example, the IPTV server 18, SIP server 20 provided on the core/access network 12, IPTV terminals 40 connected with each other by the communication network 22, and routers 16 provided between the IPTV server 18 and SIP server 20, and between the IPTV terminals 40 and SIP server 20. The routers 16 include, for example, a network bandwidth controller 173 and a bandwidth requesting status database 175.

The network bandwidth controller 173 is configured of a CPU 161 and memory chip 163 and the like in the router 16, and operates following various types of programs stored in the memory chip 163. the network bandwidth controller 173 acts to secure and release bandwidth (network resources) for sending IPTV content data (IPTV media streams) from the content server 183 in the IPTV server 18 to the content playback clients 405 in the IPTV terminals 40. More specifically, securing processing and releasing processing is performed for bandwidth with regard to the routers 16 existing within the core/access network 12 on the path of the media steam, which is the flow of content data, and stored in the bandwidth status database 175 in the routers 16 as bandwidth securing status information and bandwidth releasing status information.

The bandwidth status database 175 is stored in, for example, the memory chip 163 in a router 16. Also, the bandwidth status database 175 may be stored in storage units (not shown) provided separately in routers 16. The bandwidth status database 175 stores and manages bandwidth management status information indicating the management state of bandwidth which the router manages. The management state of bandwidth which the routers manage indicates the state of securing and releasing bandwidth at the IPTV server 18 in the event that the router 16 is connected to the IPTV server 18, and indicates the state of securing and releasing bandwidth on the entire home network in the event that the router 16 is situated at the boundary of a home network to which multiple IPTV terminals 40 are connected. Also, the bandwidth of the router 16 to which the IPTV server 18 is connected may be set so as to reflect, for example, the processing capabilities of the IPTV server 18 (e.g., processing capabilities of the content server 183).

The IPTV server 18 includes, for example, an SIP-UAS 181 and content server 183. The SIP-UAS 181 and content server 183 are configured of the CPU, ROM, RAM, and so forth, within the IPTV server 18, and operate following various types of programs stored in ROM and a storage unit of the IPTV server 18.

The SIP-UAS 181 is a SIP user agent which functions as a server, and controls session establishing and session releasing with a later-described SIP-UAC 403 provided to the IPTV terminal 40, to respond to requests from a SIP-UAC 403.

The content server 183 performs management and distribution of IPTV contents, distributing IPTV contents to content playback clients 405 provided in the IPTV terminal 40, using the bandwidth secured by the routers 16.

The SIP server 20 includes, for example, a SIP session control unit 201 and network bandwidth management state notification unit 203. The SIP session control unit 201 and network bandwidth management state notification unit 203 are configured of the CPU, ROM, RAM, and so forth, within the SIP server 20, and operate following various types of programs stored in ROM and a storage unit of the SIP server 20.

The SIP session control unit 201 performs actions such as inquiring the destination of requests from the SIP-UAC 403, relaying requests from the SIP-UAC 403 to the SIP-UAS 181 and responses from the SIP-UAS 181 to the SIP-UAC 403, and registration location information of the user agents on the network. This SIP session control unit 201 enables functions unique to SIP to be realized, such as presence service, which is a service enabling real-time comprehension of the state of people, information, and devices, of interest. Also, the SIP session control unit 201 performs securing requests and releasing requests of bandwidth which is network resources, to the network bandwidth controller 173 implemented in the routers 16 connected to the SIP server 20.

The network bandwidth management state notification unit 203 periodically references the bandwidth management status information stored and updated in the status database 175 in the routers 16 connected to the SIP server 20, and notifies this to the SIP-UAC 403 connected to the SIP server 20. Notification from the SIP server 20 to the SIP-UAC 403 is performed by SIP presence service, for example. Bandwidth capacity, which indicates the usable bandwidth at the routers situated at the boundary of the home network to which the IPTV terminal device 40 implementing the SIP-UAC 403 regarding which notification is to be made, is recorded in the bandwidth management status information notified to the SIP-UAC 403.

The IPTV terminal 40 includes, for example, the SIP-UAC 403 and content playback client 405. The SIP-UAC 403 and content playback client 405 are configured of the CPU, ROM, RAM, and so forth, within the IPTV terminal 40, and operate following various types of programs stored in ROM and a storage unit of the IPTV terminal 40.

The SIP-UAC 403 is a user client functioning as a client, and controls session establishing and session releasing with the SIP-UAS 181 provided to the IPTV server 18, and sends requests to the SIP-UAS 181. Also, bandwidth management status information notified from the network bandwidth management state notification unit 203 of the SIP server 20 is periodically sent to the later-described bandwidth requesting device 30. the content playback client 405 requests the IPTV server 18 for distribution of IPTV contents, and plays IPTV contents distributed from the IPTV server 18. Note that the IPTV 40 will be described in further detail later.

Figure 11:
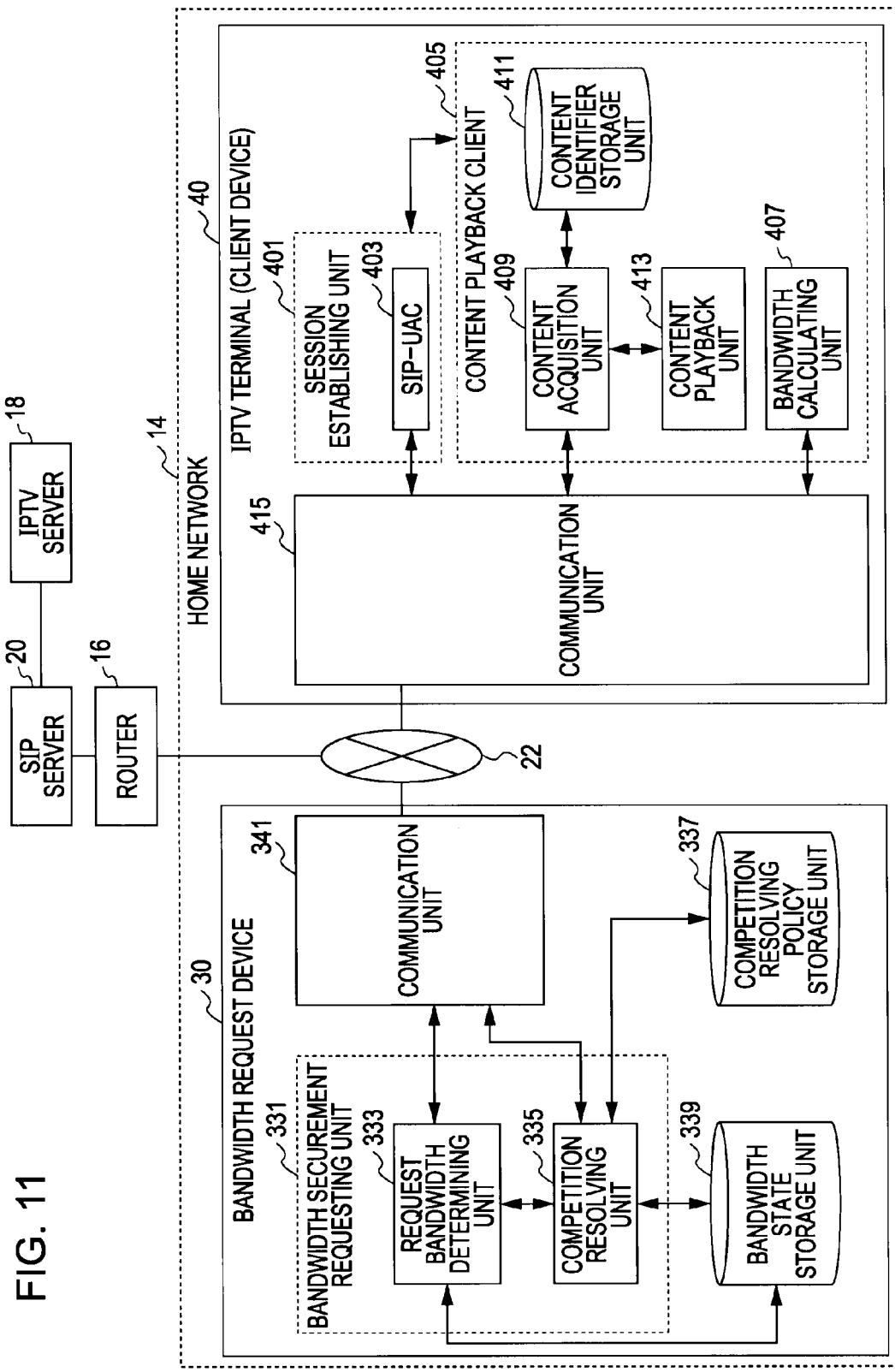
FIG. 11 is an explanatory diagram illustrating the configuration of the bandwidth requesting device 30 and IPTV terminal 40 according to the embodiment.

Next, the bandwidth requesting device 30 which has an important role in the bandwidth requesting system 10 according to the present embodiment, and the IPTV terminal 40 which is a client device, will be described in detail with reference to FIG. 11. FIG. 11 is an explanatory diagram for describing the configuration of the bandwidth requesting device 30 and IPTV terminal 40 according to the present embodiment.

(Configuration of Bandwidth Requesting Device 30)

As shown in FIG. 11, the bandwidth requesting device 30 according to the present embodiment includes, for example, a bandwidth securement requesting unit 331, a competition resolving policy storage unit 337, and a communication unit 341.

The bandwidth securement requesting unit 331 puts together the bandwidth for which appropriation is being requested from each of the multiple IPTV terminals 40 connected to the bandwidth requesting device 30 determines the request bandwidth to be requested for the entire home network 14, and sends the requested bandwidth to the SIP server 20 which is a relay server provided externally from the home network 14. The IPTV terminals 40 connected to the bandwidth requesting device 30 may be connected to the bandwidth requesting device 30 via communication network 22 as shown in FIG. 11, or may be directly connected to the bandwidth appropriation device 30 via a USB port, IEEE 1394 port such as i.LINK or the like, SCSI port, RS-232C port, or the like, provided to the bandwidth requesting device 30. The bandwidth securement requesting unit 331 is configured of the CPU, ROM, RAM, and so forth, within the bandwidth requesting device 30, and operates following various types of programs stored in ROM and a storage unit of the bandwidth requesting device 30. The bandwidth securement requesting unit 331 further comprises a request bandwidth determining unit 333 and competition resolving unit 335.

The request bandwidth determining unit 333 receives, via the communication unit 341, the bandwidth for which appropriation is being requested from each of the multiple IPTV terminals 40 connected to the bandwidth requesting device 30, and determines the bandwidth which the overall home network 14 connected to the bandwidth requesting device 30 needs. The request bandwidth determining unit 333 transmits the determined request bandwidth to the SIP server 20 via the communication 341, so as to request appropriation of bandwidth to the SIP server 20.

The request bandwidth determining unit 333 determines the request bandwidth by referring usable bandwidth capacity stored in the later-described bandwidth state storage unit 339 and information relating to IPTV session currently being played within the home network, and so forth. In the event that the total appropriation request bandwidth from each of the multiple IPTV terminals 40 is equal to or below the usable bandwidth capacity, the request bandwidth determining unit 333 sends the total of the appropriation request bandwidth to the SIP server 20 as the requested bandwidth. On the other hand, in the event that the total appropriation request bandwidth exceeds the usable bandwidth capacity, bandwidth competition will occur among the multiple IPTV terminals 40, so the later-described competition resolving unit 335 is requested to perform competition resolving processing. Upon competition being resolved by the competition resolving unit 335, the request bandwidth determining unit 333 sends the request bandwidth to the SIP server 20.

Upon bandwidth being appropriated from the SIP server 20 to the entire home network, the request bandwidth determining unit 333 distributes the bandwidth requested from each IPTV terminal 40 in the event that no competition resolving processing has been performed, and distributes bandwidth to each IPTV terminal 40 according to the results of competition resolving in the event that competition resolving has been performed.

In the event that the total of appropriation request bandwidth sent from each of the IPTV terminals 40 exceeds to the usable bandwidth capacity, the competition resolving unit 335 refers the information relating to IPTV session currently being played within the home network which is stored in the bandwidth state storage unit 339, and information relating to bandwidth capacity usable by the entire home network, and performs competition resolving of bandwidth requests among the IPTV terminals 40, based on the competition resolving policy stored in the later-described competition resolving policy storage unit 337. This competition resolving may be on-the-fly interactive competition resolving conforming to processing policies stored in the competition resolving policy storage unit 337, or may be automatic competition resolving based on a predefined competition resolving method.

The competition resolving policy storage unit 337 is a storage unit which the competition resolving unit 335 refers to in order to resolve competition over appropriation request bandwidth which has occurred among the multiple IPTV terminals 40. The competition resolving policy storage unit 337 stores multiple sets of information necessary of the competition resolving unit 335 to resolve competition over appropriation request bandwidth.

Figure 12:
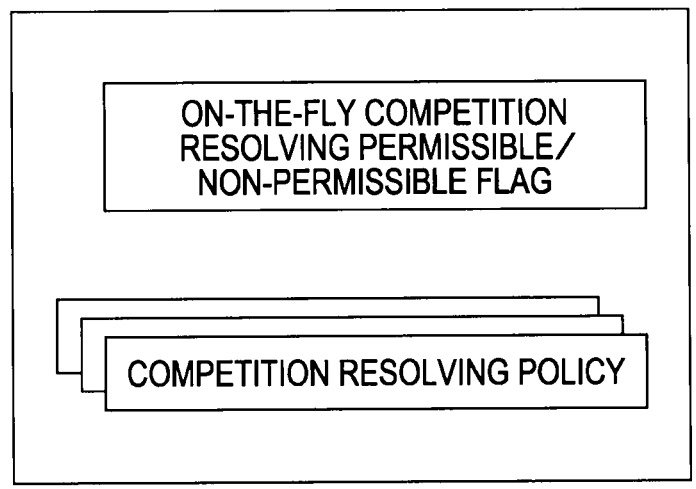
FIG. 12 is an explanatory diagram for describing competition resolving policies stored in a competition resolving policy storage unit according to the embodiment.

FIG. 12 is an explanatory diagram for describing competition resolving policy information stored in the competition resolving policy storage unit 337. As shown in FIG. 12, the competition resolving policy information is configured of an on-the-fly competition resolving permissible/non-permissible flag in which is described a flag regarding whether or not to resolve competition among the multiple IPTV terminals 40 over appropriation request bandwidth in an on-the-fly interactive manner, and competition resolving policies which have been determined beforehand, referred to in the event of performing automatic competition resolving. Multiple competition resolving policies referred to by the competition resolving unit 335 in the event that the competition resolving unit 335 performs automatic competition resolving are stored in the competition resolving policy storage unit 337. Also, the competition resolving policy storage unit 337 may store various types of parameters and so for which need to be stored at the time of the competition resolving unit 335 performing competition resolving processing.

The bandwidth state storage unit 339 stores bandwidth state information relating to the bandwidth usage state within the home network 14 to which the bandwidth requesting device 30 is connected. The bandwidth state storage unit 339 is referred to by the request bandwidth determining unit 333 and the competition resolving unit 335 at the time of the request bandwidth determining unit 333 determining requested bandwidth, and the competition resolving unit 335 performing competition resolving processing, respectively.

Figure 13:
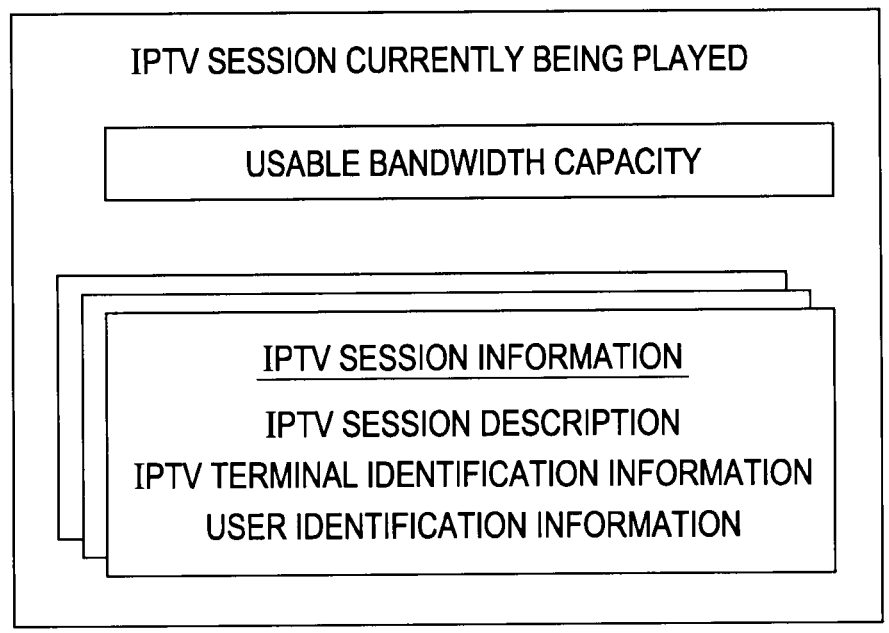
FIG. 13 is an explanatory diagram for describing bandwidth state information stored in a bandwidth state storage unit according to the embodiment.

FIG. 13 is an explanatory diagram for describing the bandwidth state information stored in the bandwidth state storage unit 339. As shown in FIG. 13, the bandwidth state information is made up of information relating to usage bandwidth capacity within the home network 14 to which the bandwidth requesting device 30 is connected, and IPTV session information relating to IPTV sessions currently being played by IPTV terminals 40 connected to the home network 14. The usable bandwidth capacity is information periodically notified to the SIP-UASs 403 of the IPTV terminals 40 by the network bandwidth management state notification unit 203 of the SIP server 20, the usable bandwidth capacity being periodically notified to the bandwidth requesting device 30 by the SIP-UASs 403, and changes in a constantly-varying manner depending on the usage state of bandwidth within the home network 14. IPTV session information has described therein information relating to IPTV sessions currently established by IPTV terminals 40 connected to the home network 14 to which the bandwidth requesting device 30 is connected, with multiple sets of IPTV session information, corresponding to the number of established IPTV sessions, being stored in the bandwidth state storage unit 339. Described in the IPTV session information in a correlated manner is, as shown in FIG. 13, IPTV session description relating to currently-established IPTV sessions, IPTV terminal identification information for identifying IPTV terminals playing these IPTV sessions, and user identification information of the IPTV terminals playing the IPTV sessions.

The communication unit 341 transmits various types of information and the like which the bandwidth securement requesting unit 331 discloses to the SIP server 20 and IPTV terminals 40, via the communication network 22. Conversely, requests and the like from the SIP server 20 and IPTV terminals 40 can be received at the bandwidth requesting device 30. Also, the communication unit 341 is capable of exchanging information with the IPTV terminals 40 directly connected to the bandwidth requesting device 30 without going through the communication network 22.

Note that while the competition resolving policy storage unit 337 and bandwidth state storage unit 339 are provided individually in the bandwidth requesting device 30 according to the present embodiment shown in FIG. 11, the competition resolving policy storage unit 337 and bandwidth state storage unit 339 may be provided within the same storage nit. Also, the bandwidth requesting device 30 according to the present embodiment may have a separate storage unit (not shown) other than the competition resolving policy storage unit 337 and bandwidth state storage unit 339 shown in FIG. 11. Also, while FIG. 11 illustrates a case wherein the competition resolving policy storage unit 337 is provided within the bandwidth requesting device 30, the competition resolving policy storage unit 337 may be provided externally from the bandwidth requesting device 30, as long as the competition resolving unit 335 can be referred.

(Configuration of IPTV Terminal 40)

AS shown in FIG. 11, the IPTV terminal 40 which is a client device according to the present embodiment includes the session establishing unit 401 and content playback client 405. The session establishing unit 401 and content playback client 405 is configured of the CPU, ROM, RAM, and so forth, within the IPTV terminal 40, and operates following various types of programs stored in ROM and a storage unit of the IPTV terminal 40.

The session establishing unit 401 establishes sessions with the IPTV server 18 which is a content distribution server provided externally from the home network 14, and releases established sessions. The session establishing unit 401 according to the present embodiment further has a SIP-UAC 403.

As described above, the SIP-UAC 403 is a user agent client in SIP, which performs establishing and releasing of sessions with the SIP-UAS 181 of the IPTV server 18 via the SIP server 20, and correlates the content server 183 of the IPTV server 18 with the content playback client 405 of the IPTV terminal 40. Also, the SIP-UAC 403 receives periodic notifications relating to usable bandwidth capacity from the network bandwidth management state notification unit 203 of the SIP server 20, and transmits information relating to the received usable bandwidth capacity to the bandwidth requesting device 30 connected to the same home network 14.

The content playback client 405 attempts acquisition of contents by requesting distribution of contents to the IPTV server 18 which is a content distribution server, and upon receiving distribution of content from the IPTV server 18, plays the distributed content. The content playback client 405 according to the present embodiment further includes, for example, a bandwidth calculating unit 407, content acquisition unit 409, content identifier storage unit 411, and content playback unit 413.

The bandwidth calculating unit 407 calculates the bandwidth which the content playback client 405 of the IPTV terminal 40 needs to play the IPTV contents. The IPTV contents differ depending on the case of playing the contents in high definition and playing the contents in low definition, so the necessary bandwidth can be calculated by selection by the user of the IPTV terminal 40, for example.

The content acquisition unit 409 makes a content distribution request to the IPTV server 18, based on the session which the SIP-UAC 403 (the session establishing unit 401) has made based on the bandwidth distributed by the bandwidth requesting device 30. At the time of content acquisition, the content acquisition unit 409 refers to the content identifier (also called Content Reference Identifier (CRID)) of the content regarding which acquisition is desired, in the later-described content identifier storage unit 411, and requests distribution of the content to the IPTV server 18 based on the IPTV session description obtained as the results of the reference. Content distribution requests will be described separately later in detail. Upon the content being distributed from the IPTV server 18, the content acquisition unit 409 acquires the content via the communication unit 415, and sends the acquired content to the content playback unit 413. Note that the acquired content may be stored by the content acquisition unit 409 in a storage unit not shown in the drawings.

The content identifier storage unit 411 is a storage unit for storing multiple sets of content identifier information (CRID information) relating to the IPTV contents. The content identifier information is information wherein the content identifier assigned to the IPTV content, and the IPTV session description corresponding to this content identifier, have been correlated. Thus, at the time of acquiring contents, the content acquisition unit 409 refers to the content identifier storage unit 411, uses the content identifier to acquire the IPTV session description correlated to this content identifier, and acquires the content.

Figure 14:
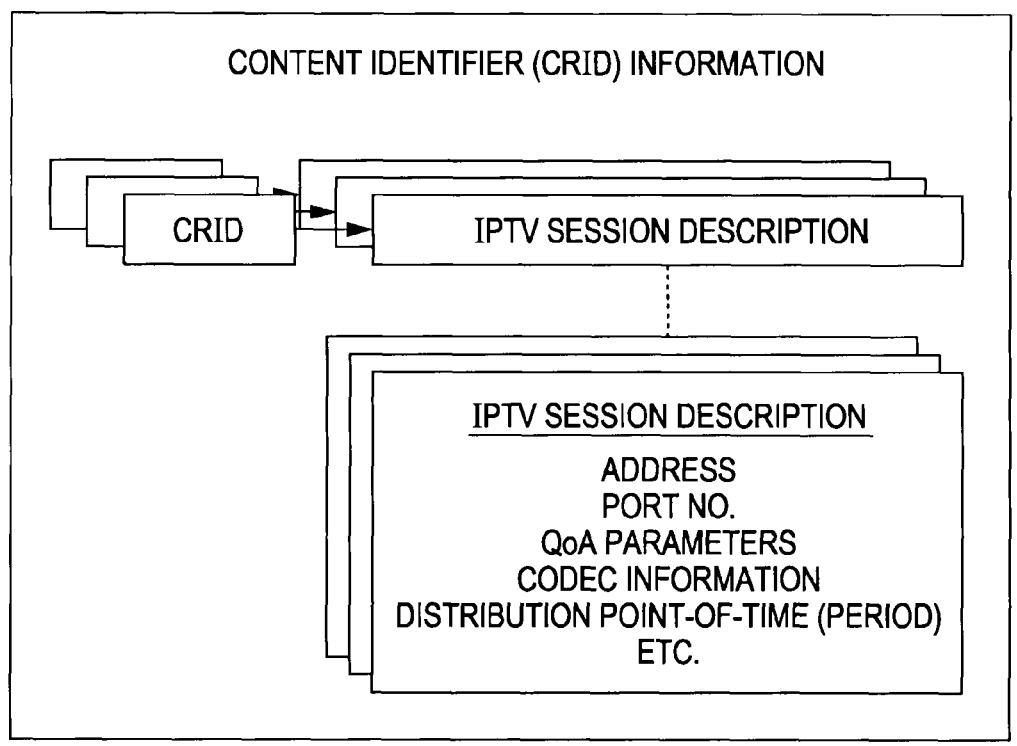
FIG. 14 is an explanatory diagram for describing content identifier information stored in a content identifier storage unit according to the embodiment.

FIG. 14 is an explanatory diagram for describing content identifier information which the content identifier storage unit 411 stores. As shown in FIG. 14, the content identifier information (CRID information) is made up of content identifiers corresponding to individual contents, and IPTV session descriptions correlated to the contents. An IPTV session description is described based on the SDP (Session Description Protocol), and as shown in FIG. 14, is configured of a URI (Uniform Resource Identifier) such as the address of the IPTV content and also port No., QoS parameters such as requested rate and the like, codec information, session description of the IPTV content (information for identifying the session), time description (valid time of the session, such as the starting and ending point-of-time of the session, number of times of repeat, and so forth), media description (information relating to media), and so forth. the content identifier information is so-called metadata, and accordingly the content acquisition unit 409 can know the content acquisition path and so forth by referring the content identifier information based on the content identifier. Note that session descriptions of multiple classes may be correlated to a single content identifier, such as high-definition mode, low definition mode, and so forth.

The content playback unit 413 plays the IPTV content sent from the content acquisition unit 409, and outputs the IPTV content to a display device (not shown) such as a display or the like provided to the IPTV terminal 40. Also, upon playing of the IPTV ending, the content playback unit 413 requests the SIP-UAC 403 to release the session, and also releases the bandwidth, which is network resources, that had been distributed to the IPTV terminal 40.

The communication unit 415 transmits, via the communication network 22, various types of information and so forth which the session establishing unit 401 and content playback client 405 disclose to the IPTV server 18 and SIP server 20 and bandwidth requesting device 30. Conversely, requests and the like from the IPTV server 18 and SIP server 20 and bandwidth requesting device 30 can be received at the IPTV terminal 40. The communication unit 415 is also capable of exchanging information with the bandwidth requesting device 30 directly connected to a connection port of an IPTV terminal 40, without going through the communication network 22.

The above has been a description of an example of the functions of the bandwidth requesting device 30 and IPTV terminal 40 according to the present embodiment. The components above may be configured using general-purpose materials and circuits, or may be configured as hardware specialized for the functions of each of the components. Also, the functions of the components may all be performed by a CPU and like components. Accordingly, the hardware configuration to be used can be modified as appropriate in accordance with the technical level for implementation of the present embodiment at that time.

(Flow from Establishing Session to Releasing Session)

Figure 15:
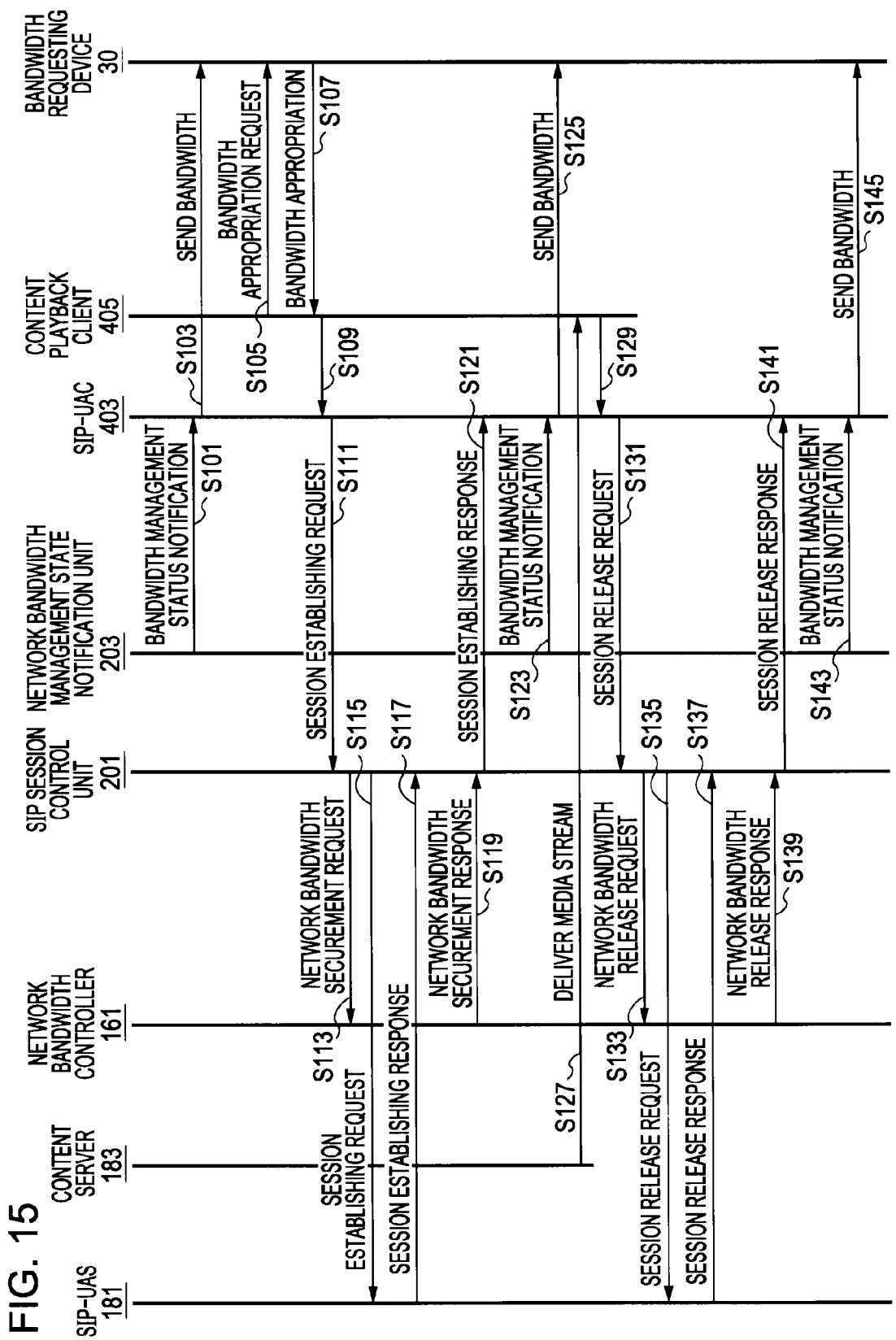
FIG. 15 is a flow diagram illustrating the session establishing/releasing method with the bandwidth requesting system 10 according to the embodiment.

Next, the procedures for an IPTV terminal 40 according to the present embodiment to establish a session and acquire an IPTV content, and release the session following the IPTV content, will be described in detail. FIG. 15 is a flow diagram illustrating the session establishing/releasing method with the bandwidth requesting system 10 according to the present embodiment.

Upon the SIP-UAC 403 of the IPTV terminal 40 being notified with bandwidth management information by the network bandwidth management state notification unit of the SIP server 20 (step S101), the SIP-UAC 403 sends the notified usable bandwidth capacity to the device 30 (step S103). Upon the content playback 405 of the IPTV terminal 40 making a bandwidth appropriation request to the bandwidth requesting device 30 to play the IPTV content (step S105), the bandwidth requesting device 30 sends the requested bandwidth to the SIP server 20 after resolving competition in the event that competition has occurred, or without performing competition resolving processing in the event that no competition has occurred, and after the SIP server 20 has secured the bandwidth, appropriates bandwidth to the content playback client 405 of the IPTV terminal 40 (Step S107) and permits the IPTV terminal 40 to establish a session.

Next, the content playback client 405 of the IPTV terminal 40 requests the SIP-UAC 403 to establish a session (step S109), and upon receiving the request, the SIP-UAC 403 performs a session establishing request to the SIP session control unit 201 of the SIP server 20 (step S111). Thereupon the SIP session control unit 201 requests the network bandwidth controller 161 of a router 16 disposed between the SIP-UAS 181 and SIP-UAC 403 to secure network bandwidth (step S113), and makes a session establishing request to the SIP UAS 181 implemented at the IPTV server 18 (step S115).

Upon a permission response corresponding to the session establishing request being sent to the SIP session control unit 201 from the SIP-UAS 181 (step S117), the network bandwidth controller 161 makes a response to the SIP session control unit 201 to the effect that network bandwidth has been secured (step S119). Upon receiving the response from the network bandwidth controller 161, the SIP session control unit 201 sends a response to the SIP-UAC 403 to the effect that a session has been established (step S121). Bandwidth management status information is then notified from the network bandwidth management state notification unit to the SIP-UAC 403 (step S123). The SIP-UAC 403 thereupon transmits the notified usable bandwidth capacity to the bandwidth requesting device 30 (step S125), and the bandwidth requesting device 30 updates the usable bandwidth capacity.

Upon a session being established between the SIP-UAS 181 and SIP-UAC 403, the content server 183 implemented at the IPTV server 18 sends a media stream (IPTV content) to the content playback client 405 implemented at the IPTV terminal 40 (step S127), and the content playback client 405 plays the content.

Upon playing of the content ending, the content playback client 405 requests the SIP-UAC 403 to release the session (step S129), and the SIP-UAC 403 makes a session releasing request to the SIP session control unit 201 (step S131). Upon receiving the request, the SIP session control unit 201 sends a network bandwidth release request to the network bandwidth controller (step S133). Next, the SIP session control unit 201 makes a session release request to the SIP-UAS 181 within the IPTV server 18 (Step S135).

The SIP-UAS 181 makes a response to the SIP session control unit 201 to the effect that session releasing will be performed (step S137), and the network bandwidth controller 161 makes a response to the SIP session control unit 201 to the effect that session releasing will be performed (step S139). The SIP session control unit 201 then makes a response to the SIP-UAC 403 to the effect that session releasing will be performed (step S141), and the session established between the SIP-UAS 181 and the SIP-UAC 403 is released.

The network bandwidth management state notification unit 203 of the SIP server 20 notifies the SIP-UAC 403 with bandwidth management status information of the change in bandwidth which has occurred as a result of releasing the session (step S143), and the SIP-UAC 403 sends the notified usable bandwidth capacity to the bandwidth requesting device 30 (step S145). Session establishing and releasing between the SIP-UAS 181 and the SIP-UAC 403 is performed according the flow described above.

(Competition Resolving Method)

Figure 16:
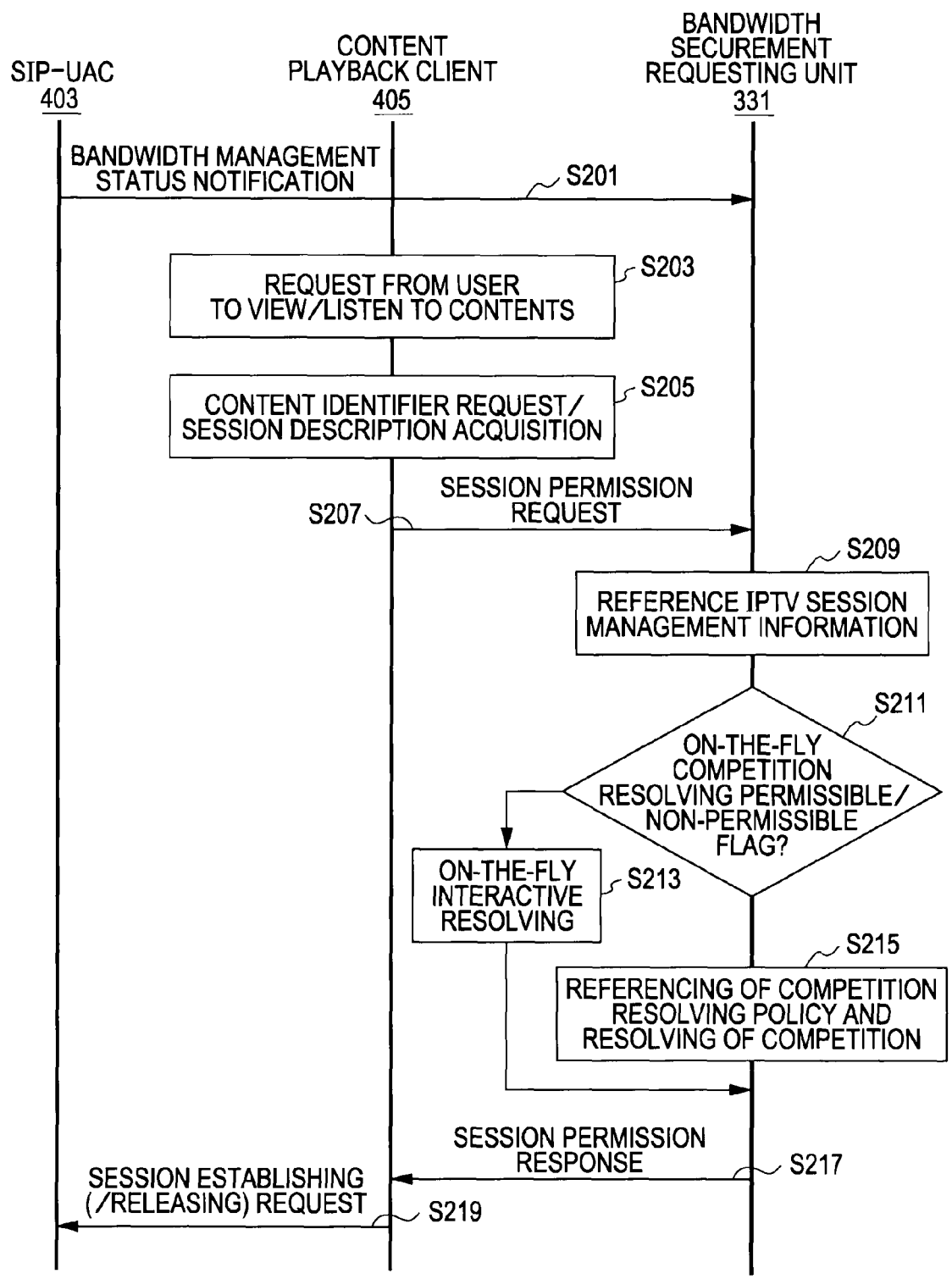
FIG. 16 is a flowchart for describing the competition resolving method with the bandwidth requesting system 10 according to the embodiment.

Next, the competition resolving method with the bandwidth requesting system according to the present embodiment will be described with reference to FIG. 16. FIG. 16 is a flowchart for describing the competition resolving method with the bandwidth requesting system according to the present embodiment.

Upon bandwidth management status information being notified from the network bandwidth management state notification unit 203 of the SIP server 20, the SIP-UAC 403 notifies the bandwidth securement requesting unit 331 of the bandwidth management status information (step S201). The bandwidth securement requesting unit 331 stores the bandwidth management status information notified thereto (particularly, information relating to usable bandwidth capacity) in the bandwidth state storage unit 339.

Upon being requested for content viewing/listening from the user (step S203), the content playback client 405 of the IPTV terminal 40 refers the content identifier storage unit within the content playback client 405 based on the content identifier of the requested content, and obtains the IPTV session description (step S205).

Next, the content playback client 405 sends a session permission request to the bandwidth securement requesting unit 331 of the bandwidth requesting device 30 existing in the same network to inquire whether or not a session can be established (step S207).

Upon receiving the session permission request from the content playback client 405, the request bandwidth determining unit 333 of the bandwidth securement requesting unit 331 makes reference to the bandwidth state storage unit 339 to refer to the IPTV session information in the home network currently (step S209). In the event that the bandwidth necessary for the session requested from the content playback client 405 is equal to or greater than the bandwidth capacity stored in the bandwidth state storage unit 339, the competition resolving unit 335 provided to the bandwidth securement requesting unit 331 performs bandwidth competition resolving processing.

The competition resolving unit 335 of the bandwidth securement requesting unit 331 refers to the competition resolving policy storage unit 337 and confirms the contents of the on-the-fly competition resolving permissible/non-permissible flag (step S211). Note however, that in the event that the on-the-fly competition resolving permissible/non-permissible flag in the competition resolving policy storage unit 337 is set to permissible (i.e., in the case of performing on-the-fly interactive competition resolving), the intent of the user regarding competition resolving is confirmed, and competition resolving is performed based on this intent (step S213). On-the-fly competition resolving will be described separately later in detail. In the event that competition has been resolved, permission is granted to the content playback client 405 for the session establishing request (session permission response) (step S217), and the newest session management information is recorded in the bandwidth state storage unit 339.

Also, in the event that the on-the-fly competition resolving permissible/non-permissible flag is set to non-permissible (i.e., in the event that on-the-fly competition resolving is not to be performed, and automatic competition resolving processing is to be performed), the competition resolving unit 335 makes reference to the competition resolving policy storage unit 337, selects a competition resolving policy fitting the current competition state from the multiple competition resolving policies stored therein, and performs competition resolving processing conforming to the resolving method defined in the selected competition resolving policy beforehand (step S215). In the event that the competition has been resolved, a session permission response is given to the content playback client 405 (step S217), and the newest session management information is recorded in the bandwidth state storage unit 339. Details of competition resolving policies will be described separately later.

Now, the above session permission response may be a case wherein the requested session establishing request is accepted as it is, a case wherein the requested session establishing request is accepted with the contents thereof changed, or a case wherein the requested session establishing request is rejected.

The content playback client 405 sends configures a SIP message based on the session description permitted by the bandwidth securement requesting unit 331 to the SIP server 20, and establishes a session with the SIP-UAC 403 (step S219).

(About Competition Resolving Policies)

Figure 17:
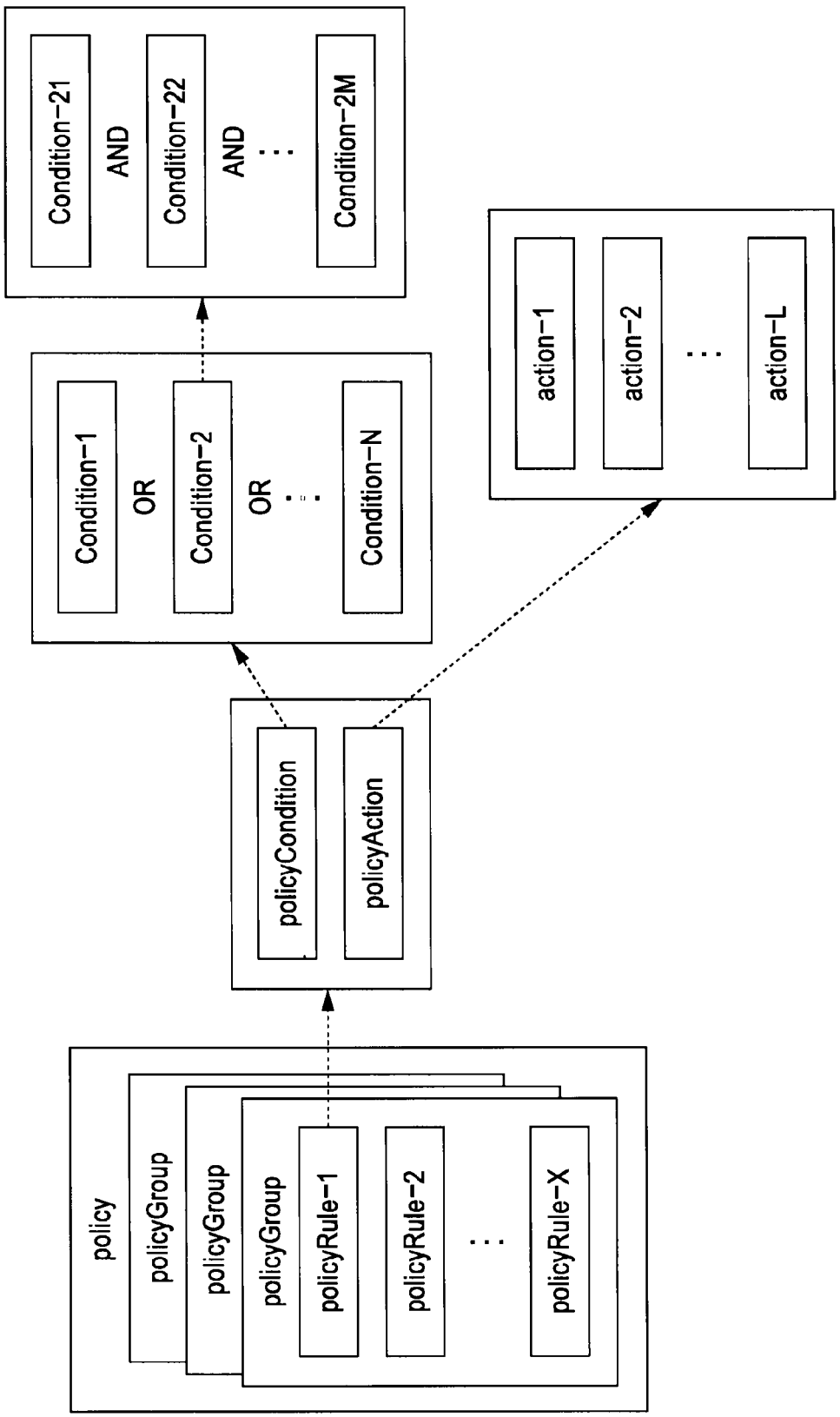
FIG. 17 is an explanatory diagram for describing competition resolving policies according to the embodiment in detail.

Next, competition resolving policies according to the present embodiment will be described in detail with reference to FIG. 17. FIG. 17 is an explanatory diagram for describing competition resolving policies according to the present embodiment in detail.

A competition resolving policy (hereafter also referred to simply as "policy") is configured of multiple policy groups (policyGroup), and a policy group is defined as a group of policy rules (policyRule). Multiple policy rules within a policy group are evaluated and reproduced in the order in which they are listed. Also, individual policy rules are configured of a pair of condition portion (policyCondition) and action portion (policyAction), with the condition portion defining conditions for when reproducing the functions and operations described in the action portion. Further, a policyCondition can define complex conditions by joining multiple Condition with AND or OR. Also, policyAction can array multiple Action sequentially. Settings are made such that in the event that even one of the policy rules within the policy group is reproduced, evaluation and execution of the remaining policy rules is quit.

(Specific Example of Policy Rule Description Format)

The policy rule description format is expressed as follows for example, using IF and THEN for the condition portion and action portion. Note that the policy rule description format described below is but an example given for describing the policy rule description format, and that the policy rule description format according to the present embodiment is not restricted to the following.

(General Format for Policy Rules)
  IF (condition) THEN (action)
  For example, the policyRule-1 in FIG. 17 is expressed as follows.
  IF (condition-1 OR (condition-21 AND Condition-22 AND . . . Condition-2M) OR . . . Condition-N)
  THEN (action-1, Action-2, . . . Action-L)

(Specific Example of Policy Rule)

The policy rule description format will be described below with reference to a specific example.

Session description of a first IPTV terminal regarding which a session has already been established will be referred to as "CurrentSessionDescription". Also, a session description sent from a second IPTV terminal for requesting newly establishing a session will be referred to as "highQualityVersionOfEvaluatingSessionDescription" and "lowQualityVersionOfEvaluatingSessionDescription". Note that "highQualityVersionOfEvaluatingSessionDescription" corresponds to a session of a high definition class version, and "lowQualityVersionOfEvaluatingSessionDescription" corresponds to a session of a low definition class version.

The priority of the first IPTV terminal regarding which the session has already been established is currentSessionTerminalClass, and the value thereof is "TerminalClass-High". Also, the priority of the second IPTV terminal requesting newly establishing a session is "evaluatingSessionTerminalClass" and the value there is "TerminalClass-Low". Note that "TerminalClass-High">"TerminalClass-Low" holds.

An action for accepting and an action for discarding a new session establishing request are "acceptRequest" and "discardRequest", respectively. Also, an action for releasing (stopping) the session of the first IPTV terminal which is already established is "quit->currentSessionDescription".

Also, the remaining capacity obtained by subtracting the resources used by the session of the first IPTV terminal already established from the bandwidth capacity of the router and home network is "remainingResourceCapacity", and we will say that the value thereof is "10".

Of session descriptions sent from the second IPTV terminal requesting newly establishing a session, the bandwidth which the high definition class version requests is "highQualityVersionOfEvaluatingSessionDescription.requiredResourceCapacity", and we will say that the value thereof is "24". Also, the bandwidth which the low definition class version requests is "lowQualityVersionOfEvaluatingSessionDescription.requiredResourcecapacity", and we will say that the value thereof is "8".

The priority set to the user using the content playback client of the first IPTV terminal regarding which a session has already been established is "currentSessionUserClass", and we will say that the value thereof is "UserClass-Low". Also, the priority set to the user using the content playback client of the second IPTV terminal requesting newly establishing a session is "evaluatingSessionUserClass", and we will say that the value thereof is "UserClass-High". Note however, that "UserClass-High">"UserClass-Low" holds.

SPECIFIC EXAMPLE 1

In the event that there is no leeway for accommodating the session of the requested class in the bandwidth capacity of the router and home network, and the terminal priority (priority class) of the first IPTV terminal is set high, the second IPTV media session is not accepted.

Description of the policy rules relating to the above conditions and resolution method is as follows.

IF ((remainingResourceCapacity<highQualityVersionOfEvaluatingSessionDescription.requiredResourcecapacity)
  AND
(currentSessionTerminalClass>evaluatingSessionTerminalClass))
  THEN (discardRequest)
  In the above case, remainingResourceCapacity="10"<highQualityversionOfEvaluatingSessionDescription.requiredResourcecapacity="24", so the first evaluation expression is true, and currentSessionTerminalClass="TerminalClass-High">evaluatingSessionTerminalClass="TerminalClass-Low" holds, so the second evaluation expression is true, and consequently, the evaluation of the entire condition is true. Accordingly, the action discardRequest thereof is executed.

SPECIFIC EXAMPLE 2

In the event that the second IPTV media session is a session regarding which selection can be made from the two QoS classes of high definition class and low definition class, and there is leeway in the bandwidth capacity of the router and home network for accommodating the low definition class session, the second session is established as a low definition class session while maintaining the first session.

Description of the policy rules relating to the above conditions and resolution method is as follows.

IF (remainingResourceCapacity>highQualityVersionOfEvaluatingSessionDescription.requiredResourcecapacity)
  THEN (acceptRequest)

IF (remainingResourceCapacity>lowQualityVersionOf
EvaluatingSessionDescription.requiredResourceCapacity)
  THEN (acceptRequest)
    In the above case,
remainingResourceCapacity="10">highQualityVersionOf
EvaluatingSessionDescription-
.requiredResourceCapacity="24", so the first policy rule is false, but remainingResourceCapacity="10">lowQualityVersionOf
EvaluatingSessionDescription-
.requiredResourceCapacity="8" holds, so the second policy rule is true. Consequently, the second action acceptRequest is executed, and the session corresponding to lowQualityVersionOfEvaluatingSessionDescription is accepted.

SPECIFIC EXAMPLE 3

In a case wherein there is no leeway to accommodate the session of the class requested in the bandwidth capacity of the router and home network, and the priority (priority class) of user using the second IPTV terminal is set high, the first session is stopped, and the second session is established at the requested definition.

Description of the policy rules relating to the above conditions and resolution method is as follows.

IF ((remainingResourceCapacity<highQualityVersionOf
EvaluatingSessionDescription.requiredResourceCapacity)
  AND
(currentSessionUserClass<evaluatingSessionUserClass))
  THEN (quit->currentSessionDescription, acceptRequest)
    In this case,
remainingResourceCapacity="10"<highQualityVersionOf
EvaluatingSessionDescription-
.requiredResourceCapacity="24", so the first evaluation expression is true, and currentSessionUserClass="UserClass-Low"<evaluatingSessionUserClass="UserClass-High", so the second evaluation expression is true. Consequently, the evaluation of the entire condition is true, and the current session is quit with the action quit->currentSessionDescription, and the session corresponding to highQualityVersionOfEvaluatingSessionDescription is accepted with acceptRequest.

In addition to these specific examples, day-of-the-week or time-of-the-day, type of content being viewed/listened to (e.g., sports coverage), etc., or combined conditions thereof, can be conceived as complex policies to take into consideration, for example.

(About On-the-Fly Interactive Competition Resolving)

Figure 18:
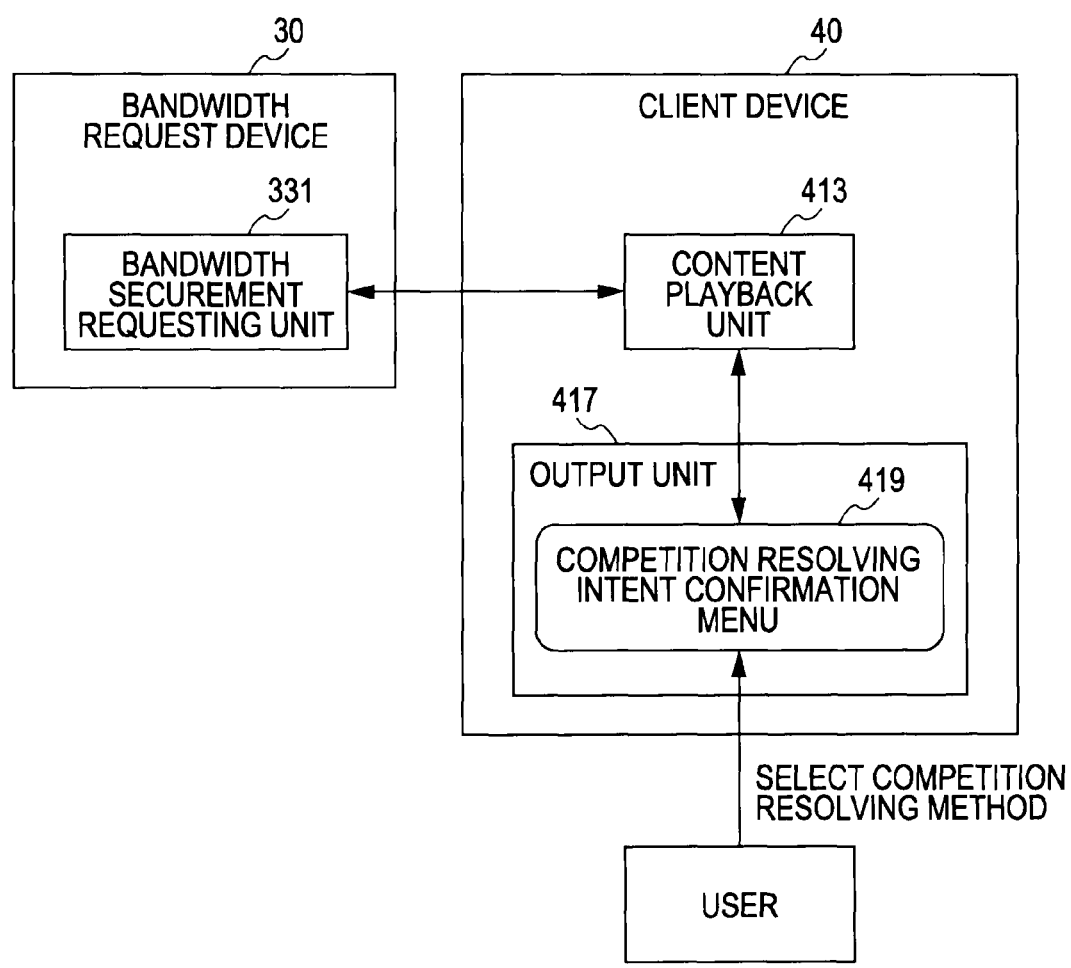
FIG. 18 is an explanatory diagram for describing on-the-fly interactive competition resolving in the bandwidth requesting system 10 according to the embodiment.
Figure 19:
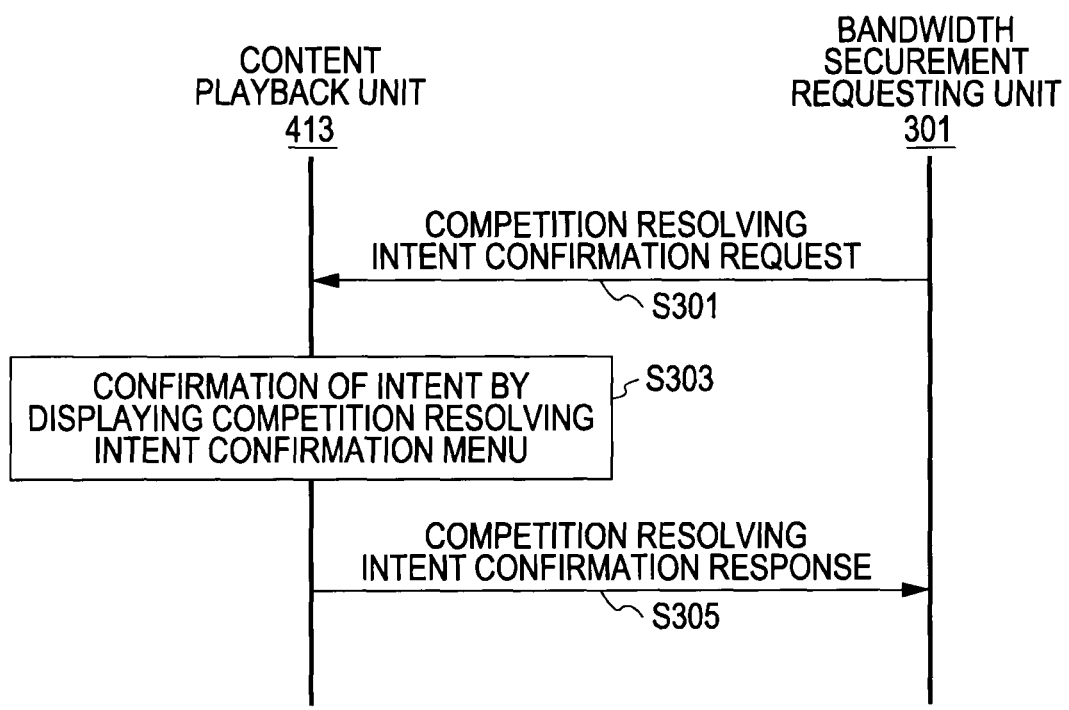
FIG. 19 is a flowchart for describing the on-the-fly interactive competition resolving in the bandwidth requesting system 10 according to the embodiment.

Next, the on-the-fly interactive competition resolving processing according to the present embodiment will be described with reference to FIGS. 18 and 19. FIG. 18 is an explanatory diagram for describing on-the-fly interactive competition resolving in the bandwidth requesting system 10 according to the present embodiment, and FIG. 19 is a flowchart for describing the on-the-fly interactive competition resolving in the bandwidth requesting system 10 according to the present embodiment.

The bandwidth securement requesting unit 331 confirms the intent of the user regarding bandwidth request competition resolving, and several selections such as given below, for example, can be conceived as methods for confirming intent.

FIRST INTENT CONFIRMATION EXAMPLE

Case of confirming intent of user executing content playback client 405 requesting session establishing

SECOND INTENT CONFIRMATION EXAMPLE

Case of causing user executing content playback client 405 requesting session establishing, and user executing content playback client 405 having already-established session, to negotiate, and confirming intent

THIRD INTENT CONFIRMATION EXAMPLE

Case of inquiring and confirming intent of priority user having all authority for competition resolving on the home network In cases such as in the examples above, as shown in FIG. 18, the bandwidth securement requesting unit 331 can confirm the intent of an end user by having an interactive menu (competition resolving intent confirmation menu 419) to be displayed on the output unit 417 of the IPTV terminal 40 which is a client device, based on one of the above policies, and performing competition resolving based on that intent.

That is to say, as shown in FIG. 19, bandwidth securement requesting unit 331 delivers a competition resolving intent confirmation request to the content playback unit 413 (step S301), the content playback unit 413 displays an intent confirmation menu (competition resolving intent confirmation menu 419) to the user, so as to confirm the intent of the user (Step S303). The content playback unit 413 transmits the input intent of the user to the bandwidth securement requesting unit 331 (step S305) as a competition resolving intent confirmation response, and the bandwidth securement requesting unit 331 performs competition resolving processing.

As described above, disposing the bandwidth requesting device 30 at the home network 14 side enables excessive load of competition resolving provided at the core/access network 12 side in the case of a blanket simultaneous type IPTV session, such as a live coverage of an event or the like, or a blanket release VOD or the like, thereby improving the performance of competition resolving processing, and also enables detailed competition resolving matching the needs of the user to be performed based on not only general competition resolving policy definitions provided at the core/access network 12 side but also on competition resolving policies customized to individual home network environments.

(About Determining Bandwidth Capacity in Bandwidth Management Status Information)

Next, a method for determining bandwidth capacity in the bandwidth management status information according to the present embodiment will be briefly described with reference to FIGS. 20 through 22.

The bandwidth management status information according to the present embodiment stores usable bandwidth capacity at the router provided at the boundary of the home network as described above, and the following examples can be conceived as methods for determining this bandwidth capacity.

First Bandwidth Capacity Determination Method Example

Figure 20:
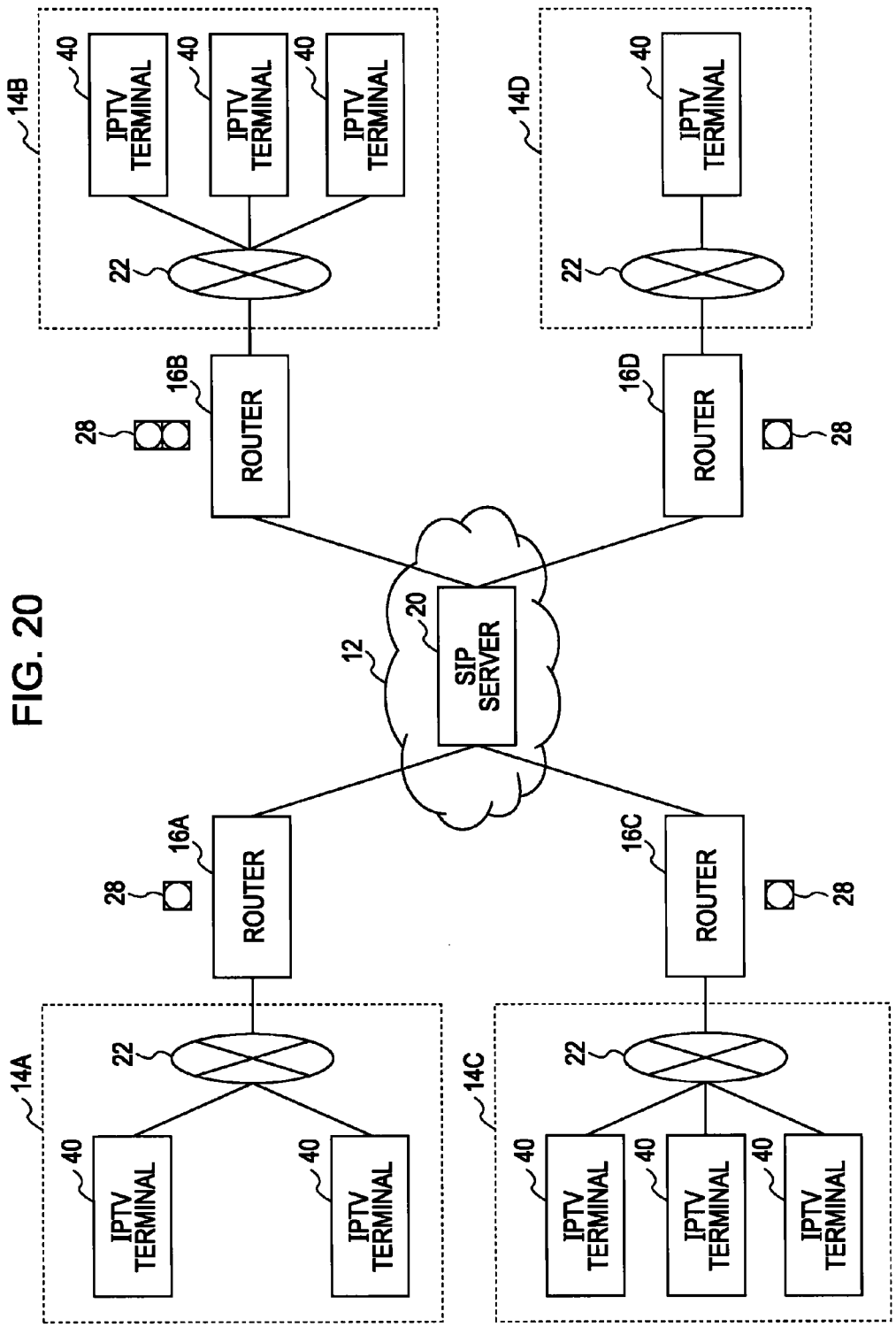
FIG. 20 is an explanatory diagram for describing a method for determining bandwidth capacity in bandwidth management status information according to the embodiment.

FIG. 20 is an explanatory diagram for describing a first example for a method for determining bandwidth capacity. As shown in FIG. 20, a case will be considered wherein an SIP server 20 is provided to the core/access network 12, and four routers 16A through 16D are connected to the SIP server 20. Each of the routers 16A through 16D correspond to the routers provided at the boundary of home networks 14A through 14D. Each of the routers 16A through 16D are connected to IPTV terminals 40 via communication networks 22. Also, each of the routers 16A through 16D have bandwidth capacitys 28 individually set.

One example of a method for determining bandwidth capacity which can be conceived is to specify the minimum guaranteed rate stipulated by SLA (Service Level Agreement) in the IPTV service contract of each home network to which each router corresponds, for example. Here, this SLA is what a communication service provider guarantees a user for service quality, and includes service quality guarantee items such as maximum communication speed of the like, average delay time within the network, upper limit of unusable time, and the like, rules regarding discounting of fees in the event that these cannot be realized, and so forth.

In FIG. 20, the home networks 14A, 14C, and 14D each have each contracted a bandwidth capacity 28 of capacity 1 as the minimum guaranteed rate, and the home network 14B has contracted a bandwidth capacity 28 of capacity 2 as the minimum guaranteed rate. Accordingly, the SIP server 20 sets the minimum guaranteed rate of the bandwidth capacity 28 conforming to the contracts for each of the routers situated at the boundaries of each of the networks.

In the case of this first example, the load on the SIP server 20 is small since all that is necessary is to set the minimum guaranteed rate conforming to the contract, but in the event that the home networks 14A through 14D attempt to secure bandwidth exceeding that of the contact, bandwidth request competition occurs within each home network.

Second Bandwidth Capacity Determination Method Example

Figure 21A:
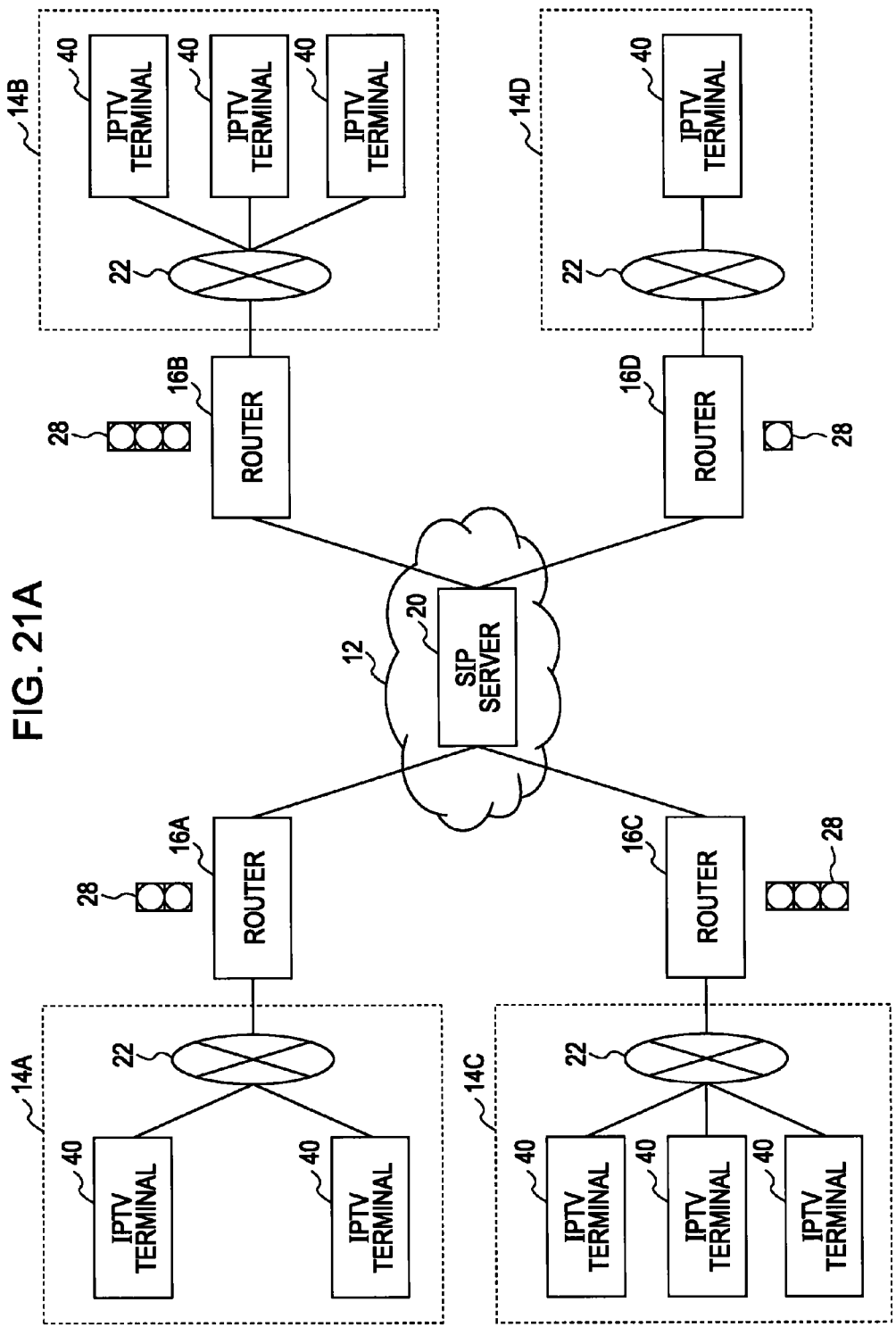
Figure 21B:
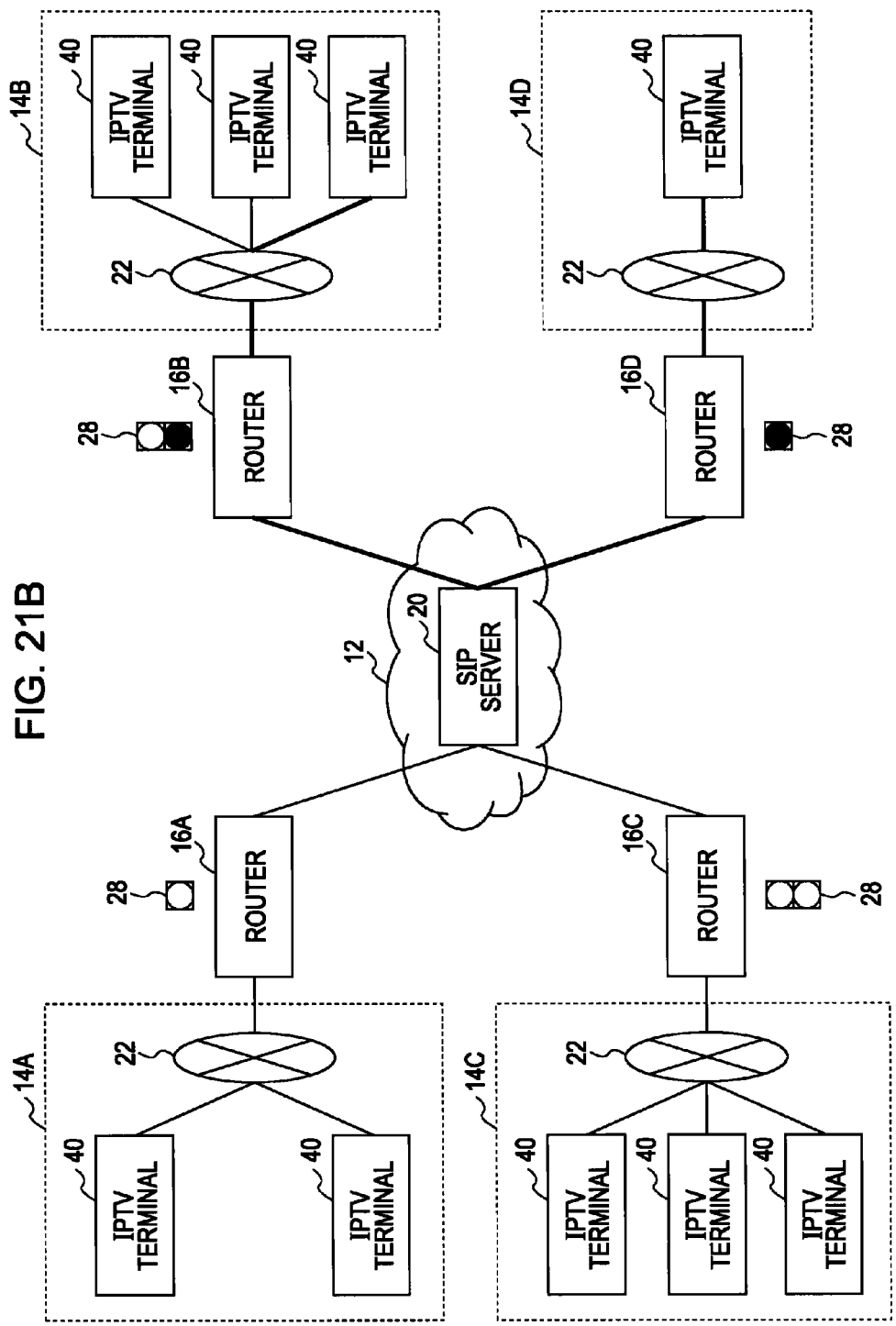

FIGS. 21A through 21C are explanatory diagrams for describing a second example for a method for determining bandwidth capacity. The second example for a method for determining bandwidth capacity is a determining method wherein the bandwidth capacity is broadly set high for time spans at which few service users are expected (e.g., late night, early morning, etc.) for example, so as to accept requests from as many clients as possible. However, the capacity is increased/decreased according to the bandwidth usage state (each time a new client establishes/releases a session by SIP for example), taking into consideration the overall bandwidth consumption state of the core/access network.

With this method, as shown in FIG. 21A, the bandwidth capacity of the routers 16 situated at the boundary of the home networks is set high beforehand, speculating the number of clients for each home network. In the example shown in FIG. 21A, two IPTV terminals 40 are connected to the home network 14A, so the router 16A situated at the boundary has the bandwidth capacity set to capacity 2 beforehand. In the same way, the routers 16B and 16C have the bandwidth capacity set to capacity 3, and the router 16D has the bandwidth capacity set to capacity 1.

Now, as shown in FIG. 21B, let us say that one IPTV terminal 40 within the home network 14B requests the SIP server 20 to establish a session, and one IPTV terminal 40 within the home network 14D requests the SIP server 20 to establish a session. In this case, the SIP server 20 accepts the requests from each of the home networks 14, and increases/decreases the bandwidth capacitys of each of the routers 16 in accordance with the bandwidth consumption state of the other home networks.

In FIG. 21B, the home network 14B and home network 14D have established sessions with the SIP server 20, each consuming bandwidth capacity of capacity 1. At this time, the SIP server 20 performs determination based on the load state and the like of the core/access network 12 and the other home networks, and reduces the bandwidth capacity of the router 16A, router 16B, and router 16C.

In the event that time further elapses and one IPTV terminal 40 within the home network 14C requests the SIP server 20 to establish a session, the SIP server 20 accepts the request from the home network 14C, performs determination based on the load state and the like of the core/access network 12 and the other home networks, and reduces the bandwidth capacity of the router 16C.

With such a method for determining bandwidth capacity, the bandwidth capacity is determined based on the load state of sessions currently being played, so a comfortable content distribution environment can be provided to the users of the home networks.

Third Bandwidth Capacity Determination Method Example

Figure 22:
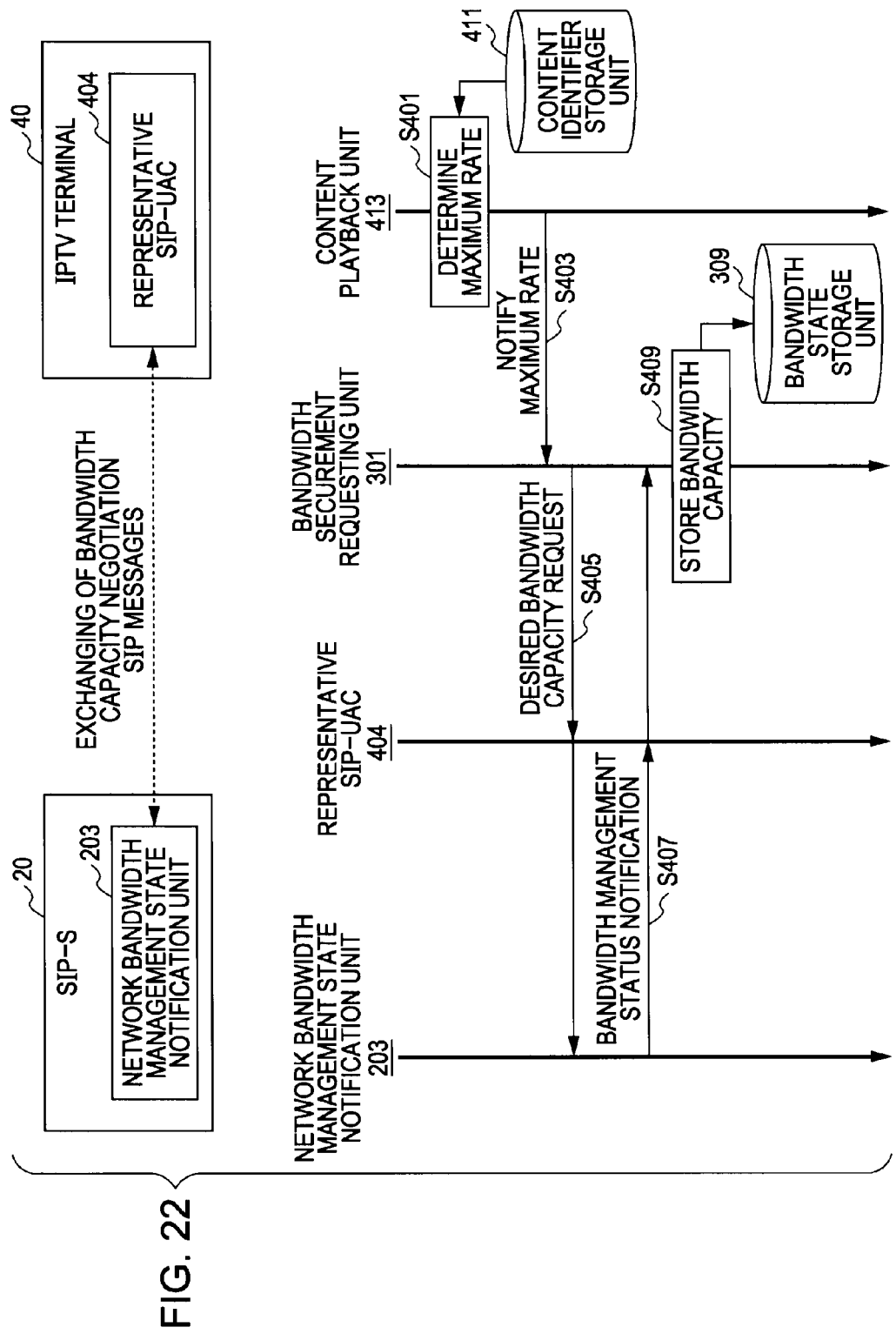
FIG. 22 is a flow diagram for describing a method for determining bandwidth capacity in bandwidth management status information according to the embodiment.

FIG. 22 is a flow diagram for describing a third example for a method for determining bandwidth capacity. With the third example, a bandwidth securement requesting unit in each home network declares a desired bandwidth capacity beforehand by a SIP message (desired bandwidth capacity request) to the network bandwidth management state notification unit through a representative SIP-UAC, and the network bandwidth management state notification unit determines capacity by negotiation of capacity wherein the usage state of the entire network bandwidth is taken into consideration, and notification is made by SIP message (bandwidth management status notification). Note that the representative SIP-UAC can be determined beforehand amount the SIP-UACs in the home network.

This method for determining bandwidth capacity will be described in brief with reference to FIG. 22.

First, each content playback unit within the home network determines, of the session descriptions stored in the content identifier storage units of the terminals, the session description planned from time to time with the greatest rate (step S401). Next, the content playback units notify the bandwidth securement requesting unit of the maximum rates (step S403).

Next, the bandwidth securement requesting unit totals the notified maximum rates, notifies this to the representative SIP-UAC as a desired bandwidth capacity, and the representative SIP-UAC which has received the notification notifies the network bandwidth management state notification unit of this as a desired bandwidth capacity request, by SIP message (S405).

The network bandwidth management state notification unit which has received the notification determines the capacity, notifies the representative SIP-UAC in the form of a bandwidth management status notification by SIP message, and the representative SIP-UAC notifies the bandwidth securement requesting unit of the capacity (step S407). Subsequently, the bandwidth securement requesting unit stores the notified capacity as bandwidth capacity in the bandwidth state storage unit (S409).

With such a method for determining bandwidth capacity, the bandwidth securement requesting unit requests the SIP server for bandwidth based on bandwidth capacity of the maximum rates notified from the content playback units, so the SIP server can efficiently appropriate bandwidth.

While an embodiment of the present invention has been described with reference to the attached drawings, it is needless to say that the present invention is not restricted to this example. It is clear that anyone skilled in the art can conceive various modifications and alterations within the scope of the Claims, and it is understood that these also belong to the technical scope of the present invention.

For example, while the above embodiment has been described regarding a case of the bandwidth requesting device being provided separately from the IPTV terminals, but an arrangement may be made wherein one IPTV terminal connected to a home network also functions as the bandwidth requesting device, or an arrangement may be made wherein each of the multiple IPTV terminals connected to the home network function as bandwidth requesting devices, performing processing in a scattered manner.

It should be understood by those skilled in the art that various modifications, combinations, sub-combinations and alterations may occur depending on design requirements and other factors insofar as they are within the scope of the appended claims or the equivalents thereof.

What is claimed is:

1. A bandwidth requesting system, comprising:
   a router provided externally from a network and connected to said network;
   a relay server provided externally from said network and connected to said network via said router; and
   bandwidth requesting circuitry provided to the network in which a plurality of client devices configured to stream video content are connected and each having a unique priority level, the bandwidth requesting circuitry configured to:
      receive bandwidth management information from the relay server,
      determine a request bandwidth based on the bandwidth management information and all bandwidths for said plurality of client devices connected to said network,
      request said request bandwidth from said relay server via said router, and
      resolve a competition among the bandwidths for said plurality of client devices by adjusting a quality of service for each client device according to the priority level for each respective client device, wherein
   said relay server is configured to determine a bandwidth to appropriate to said network, based on a bandwidth capacity for appropriation to said network and the request bandwidth requested from said bandwidth requesting circuitry, and appropriate said bandwidth to said bandwidth requesting circuitry via said router, and
   the quality of service for each client device is adjusted by adjusting an output resolution of the streamed video content.

2. The bandwidth requesting system according to claim 1, wherein said relay server is a SIP server.

3. A bandwidth requesting device connected to a plurality of client devices via a network, each of the client devices configured to stream video content and each having a unique priority level, said bandwidth requesting device comprising:
   circuitry configured to
      receive bandwidth management information from a relay server;
      determine a request bandwidth, based on the bandwidth management information and bandwidths requested from each of the client devices;
      request the request bandwidth from the relay server; and
      resolve a competition among the bandwidths for said plurality of client devices by adjusting a quality of service for each client device according to the priority level for each respective client device, the quality of service adjusted by adjusting an output resolution of the streamed video content for each respective client device.

4. The bandwidth requesting device according to claim 3, wherein said circuitry is further configured to:
   request from each of the client devices, a competition resolving policy, each time said competition is to be resolved,
   resolve said competition based on said competition resolving policy and said priority levels, and
   distribute the bandwidths appropriated from said relay server to said plurality of client devices.

5. The bandwidth requesting device according to claim 3, wherein the circuitry is further configured to:
   store a competition resolving policy, the resolving of said competition is based on said stored competition resolving policy, and
   distribute the bandwidths appropriated from said relay server to said plurality of client devices.

6. The bandwidth requesting device according to claim 5, wherein said circuitry is further configured to:
   correlate a competition when the competition occurs among said plurality of client devices connected to said network with a corresponding competition resolving policy, and
   store a plurality of corresponding competition resolving policies.

7. The bandwidth requesting device according to claim 3, wherein the circuitry is further configured to
   store the bandwidths appropriated by said relay server, a bandwidth distribution state at said plurality of client devices, and identification information of said plurality of client devices.

8. The bandwidth requesting device according to claim 3, wherein said relay server is a SIP server.

9. A client device to-be connected to a bandwidth requesting device via a network, the client device comprising:
   circuitry configured to:
      calculate a bandwidth necessary for streaming a video content;
      receive bandwidth management information from a relay server and send the bandwidth management information to said bandwidth requesting device;
      send a request for said calculated bandwidth to said bandwidth requesting device;
      acquire said bandwidth allocated by said bandwidth requesting device;
      establish a session with a content distribution device, based on said allocated bandwidth, the content distribution device streaming video content and provided external to said network and connected to the relay server; and
      stream said video content from said content distribution device.

10. The client device according to claim 9, wherein said relay server is a SIP server, and said circuitry is configured to function as a SIP user agent.

11. A bandwidth requesting method implemented by a bandwidth requesting device provided to a network, the bandwidth requesting method comprising:
   receiving bandwidth management information from a relay server external to the network and connected to the network via a router;
   determining a request bandwidth, based on the bandwidth management information and bandwidths requested from a plurality of client devices configured to stream video content and connected to the network;
   requesting, from the relay server, said request bandwidth; and
   resolve a competition among the bandwidths for said plurality of client devices by adjusting a quality of service for each client device according to a priority level for each respective client device, the adjusting the quality of service including adjusting an output resolution of the streamed video content for each respective client device.

12. A non-transitory computer-readable storage medium encoded with a program for causing a computer, connected via a network to a plurality of client devices configured to stream video content, to perform a method comprising:
- receiving bandwidth management information from a relay server external to the network and connected to the network via a router;
- determining a request bandwidth, based on the bandwidth management information and bandwidths requested from said plurality of client devices;
- requesting said request bandwidth from the relay server; and
- resolving a competition among the bandwidths for said plurality of client devices by adjusting a quality of service for each client device according to a priority level for each respective client device, the adjusting the quality of service including adjusting an output resolution of the streamed video content for each respective client device.

13. A client device comprising:
circuitry configured to:
- calculate a bandwidth necessary for streaming a video content; connect to a network;
- receive bandwidth management information including information relating to available bandwidth over the network;
- determine whether another device within the network requires bandwidth;
- resolve, when another device within the network requires bandwidth, a competition with the other device, to determine an allocated bandwidth, otherwise determine that the allocated bandwidth is the bandwidth necessary for streaming a video content;
- establish a session with a content distribution device, based on the allocated bandwidth, the content distribution device streaming video content and provided external to said network; and
- stream said video content from said content distribution device, wherein the circuitry resolves the competition for bandwidth with the other device by adjusting a quality of service according to a priority level for each respective device, the adjusting the quality of service including adjusting an output resolution of the streamed video content for each respective client device.

14. A bandwidth requesting method comprising:
- calculating a bandwidth necessary for streaming a video content;
- connecting, by circuitry, to a network;
- receiving bandwidth management information including information relating to available bandwidth over the network;
- determining, by the circuitry, whether another device within the network requires bandwidth;
- resolving, by the circuitry, when another device within the network requires bandwidth, a competition with the other device, to determine an allocated bandwidth, otherwise determine that the allocated bandwidth is the bandwidth necessary for streaming a video content;
- establishing, by the circuitry, a session with a content distribution device, based on the allocated bandwidth, the content distribution device streaming video content and provided external to said network; and
- streaming said video content from said content distribution device, wherein
- the resolving the competition for bandwidth with the other device includes adjusting a quality of service according to a priority level for each respective device by adjusting an output resolution of the streamed video content for each respective client device.

15. The bandwidth requesting system according to claim 1, wherein when the plurality of client devices includes as first client device and a second client device, the circuitry is further configured to:
- compare the priority level for each of the first client device and the second client device; and
- adjust the quality of service for each of the first client device and the second client device, wherein
- when the first client device has a high priority level and a bandwidth required by the first client device and the second client device is greater than the bandwidth appropriated by the relay server, the circuitry denies a bandwidth request by the second client device,
- when the first client device and the second client device both have priority levels that are not high and the bandwidth required by the first client device and the second client device is greater than the bandwidth appropriated by the relay server, the circuitry maintains lowers the quality of service for both the first client device and the second client device, and
- when the second client device has a high priority level and the bandwidth required by the first client device and the second client device is greater than the bandwidth appropriated by the relay server, the circuitry terminates the bandwidth appropriated to the first client device.

* * * * *